(12) United States Patent
Mihlbauer et al.

(10) Patent No.: US 11,454,030 B2
(45) Date of Patent: Sep. 27, 2022

(54) BUCKET HOLDER FOR USE ON PITCHED ROOFS

(71) Applicants:Jamie Phillip Mihlbauer, Lahaina, HI (US); James Bergdoll, East Setauket, NY (US)

(72) Inventors: Jamie Phillip Mihlbauer, Lahaina, HI (US); James Bergdoll, East Setauket, NY (US)

( * ) Notice: Subject to any disclaimer, the term of this patent is extended or adjusted under 35 U.S.C. 154(b) by 261 days.

(21) Appl. No.: 16/711,731

(22) Filed: Dec. 12, 2019

(65) Prior Publication Data

US 2020/0190811 A1    Jun. 18, 2020

Related U.S. Application Data

(60) Provisional application No. 62/781,340, filed on Dec. 18, 2018.

(51) Int. Cl.
*F16M 11/00* (2006.01)
*E04D 15/00* (2006.01)
*F16M 13/02* (2006.01)

(52) U.S. Cl.
CPC .......... *E04D 15/00* (2013.01); *F16M 13/022* (2013.01)

(58) Field of Classification Search
CPC ...... F16M 13/022; E04D 15/00; E04D 15/02; B25H 3/00
See application file for complete search history.

(56) References Cited

U.S. PATENT DOCUMENTS

| | | | |
|---|---|---|---|
| 1,423,726 A * | 7/1922 | Mohr | B44D 3/14 |
| | | | 182/45 |
| 2,750,139 A | 6/1956 | Young | 248/148 |
| 2,982,982 A * | 5/1961 | Swift, Sr. | E06C 7/14 |
| | | | 248/210 |
| 3,642,239 A * | 2/1972 | Zeiler, Jr. | E06C 7/14 |
| | | | 248/912 |

(Continued)

OTHER PUBLICATIONS

Notification of Transmittal of the International Search Report and the Written Opinion of the International Searching Authority, or the Declaration dated Mar. 5, 2020, which was issued by the International Bureau of WIPO in Applicants' corresponding international PCT application having Serial No. PCT/US2019/065910, filed on Dec. 12, 2019.

(Continued)

*Primary Examiner* — Amy J. Sterling
(74) *Attorney, Agent, or Firm* — Bodner & O'Rourke, LLP; Gerald T. Bodner; Christian P. Bodner

(57) ABSTRACT

A bucket holder for use on pitched roofs and for holding a bucket in an upright, vertical disposition includes a planar base which is adapted to rest on the surface of the roof, a generally cylindrically-shaped main canister for holding the bucket, the main canister being mounted on the base, and a top ring mounted on the main canister. The main canister has a multi-faceted, bucket supporting inner wall formed of a plurality of segments having different relative heights and angles. When a bucket is placed in the main canister of the bucket holder in a desired position, the bottom of the bucket rests on one or more of the segments such that the bucket is held in an upright, vertical disposition when the bucket holder is used on a pitched roof.

19 Claims, 38 Drawing Sheets

(56) References Cited

U.S. PATENT DOCUMENTS

| | | | | |
|---|---|---|---|---|
| 4,891,905 A * | 1/1990 | Stolz | A01G 9/0299 | |
| | | | 47/40.5 | |
| 5,078,350 A * | 1/1992 | Zorichak | B44D 3/14 | |
| | | | 248/148 | |
| 5,217,193 A * | 6/1993 | Drucker | E04D 15/00 | |
| | | | 248/154 | |
| 6,061,118 A * | 5/2000 | Takeda | G03F 7/703 | |
| | | | 355/53 | |
| 6,321,932 B1 * | 11/2001 | Butters, III | B25H 3/00 | |
| | | | 220/737 | |
| 6,533,227 B1 | 3/2003 | Rom | 248/148 | |
| 6,745,991 B1 * | 6/2004 | Rush | A47G 33/12 | |
| | | | 47/40.5 | |
| 7,984,821 B1 * | 7/2011 | Malmberg | E04D 15/00 | |
| | | | 220/570 | |
| D673,338 S * | 12/2012 | Branham | E04D 15/00 | |
| | | | D32/53 | |
| 9,079,453 B1 * | 7/2015 | Cox | B44D 3/14 | |
| 10,189,298 B2 * | 1/2019 | Kahra | B44D 3/14 | |
| D918,511 S * | 5/2021 | Rane | G03F 7/703 | |
| | | | D32/53 | |
| 2013/0240699 A1 | 9/2013 | Dillinger et al. | 248/237 | |

OTHER PUBLICATIONS

Written Opinion of the International Searching Authority, dated Mar. 5, 2020, which was issued by the International Bureau of WIPO in Applicants' corresponding international PCT application having Serial No. PCT/US2019/065910, filed on Dec. 12, 2019.

International Search Report, dated Mar. 5, 2020, which was issued by the International Bureau of WIPO in Applicants' corresponding international PCT application having Serial No. PCT/US2019/065910, filed on Dec. 12, 2019.

\* cited by examiner understand# BUCKET HOLDER FOR USE ON PITCHED ROOFS

CROSS-REFERENCE TO RELATED APPLICATIONS

This application is related to U.S. Provisional Patent Application Ser. No. 62/781,340, filed on Dec. 18, 2018, and entitled "Bucket Holder for Use on Pitched Roofs", the disclosure of which is hereby incorporated by reference and on which priority is hereby claimed.

BACKGROUND OF THE INVENTION

Field of the Invention

The present invention generally relates to apparatus used by construction workers and repairmen who perform work on pitched roofs.

Description of the Prior Art

There has always existed a problem for workmen who work on pitched roofs as to how to maintain a bucket or container in an upright, vertical disposition on the roof. Oftentimes, the bucket contains paint, roof cement, patching material or other liquid or semi-liquid substance which, by gravity, assumes a level disposition within the bucket and which may spill from the bucket if the bucket is placed to rest directly on the pitched roof. Or, the bucket or container may be used to hold the workmen's tools, or repair or construction material. If the bucket was not mounted in an upright, vertical disposition, the bucket may tip over, spilling the contents thereof.

Furthermore, roofs have different slopes and pitches. Therefore, even if a temporary platform were built to hold the bucket in an upright, vertical disposition, it would be specifically designed for a roof having a particular pitch and would not be adaptable for use with roofs of other pitches.

OBJECTS AND SUMMARY OF THE INVENTION

It is an object of the present invention to provide a bucket holder for use on pitched roofs.

It is another object of the present invention to provide an apparatus that holds a bucket in an upright, vertical disposition on a pitched roof.

It is a further object of the present invention to provide a device that holds a bucket in an upright, vertical disposition on a pitched roof and which is useable on roofs having different pitches.

In accordance with one form of the present invention, a bucket holder for use on pitched roofs basically includes a planar base which is adapted to rest on the surface of the roof, a generally cylindrically-shaped main canister for holding the bucket in an upright, vertical disposition, the main canister being mounted on the base, and a bucket supporting top ring mounted on the main canister. The main canister has a multi-faceted, inner, bucket supporting wall formed of a plurality of segments having different relative heights and angles. When a bucket is placed in the main canister of the bucket holder in a desired position, the bottom of the bucket rests on one or more of the segments. U-shaped clips mounted to elastic bungee cords that are fastened to the main canister or top ring of the bucket holder engage the rim surrounding the open top end of a bucket placed in the main canister to help secure the bucket in place on the bucket holder.

The bucket is placed in the holder to rest on selected segments based on the pitch of the roof on which the bucket holder is used such that the bucket is supported by the holder in an upright, vertical disposition to prevent the contents thereof from spilling. The segments are provided with relative heights and angles such that a bucket supported by the holder will be held in an upright, vertical disposition on roofs with the most common pitches, such as pitches of $2/12$, $4/12$, $6/12$ and $8/12$, where the numerator and denominator respectively represent the vertical change in height of the roof (e.g., two feet) over a predetermined horizontal length (e.g., twelve feet).

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
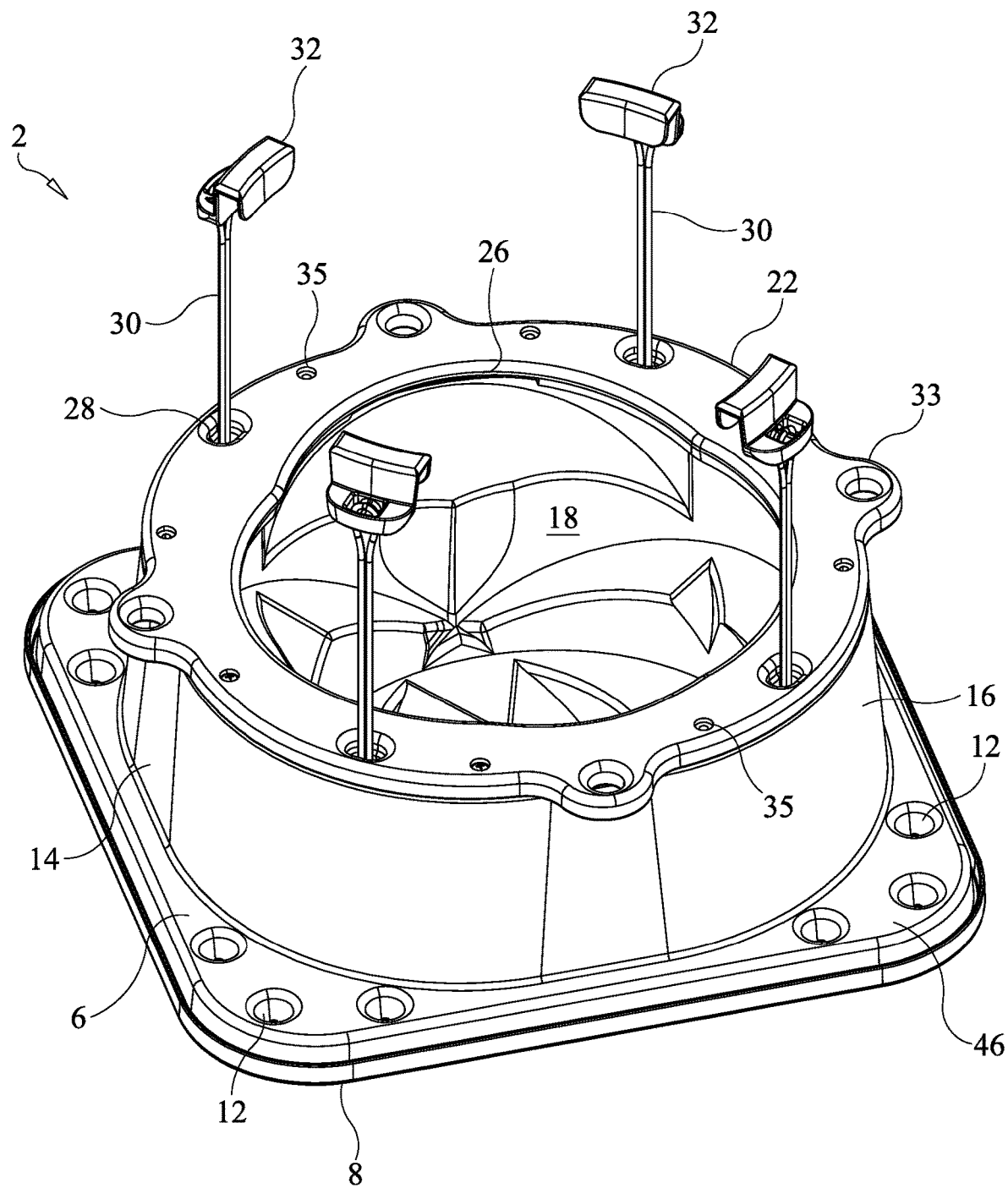
FIG. 1 is a top perspective view of a bucket holder constructed in accordance with a first form of the present invention.
Figure 2:
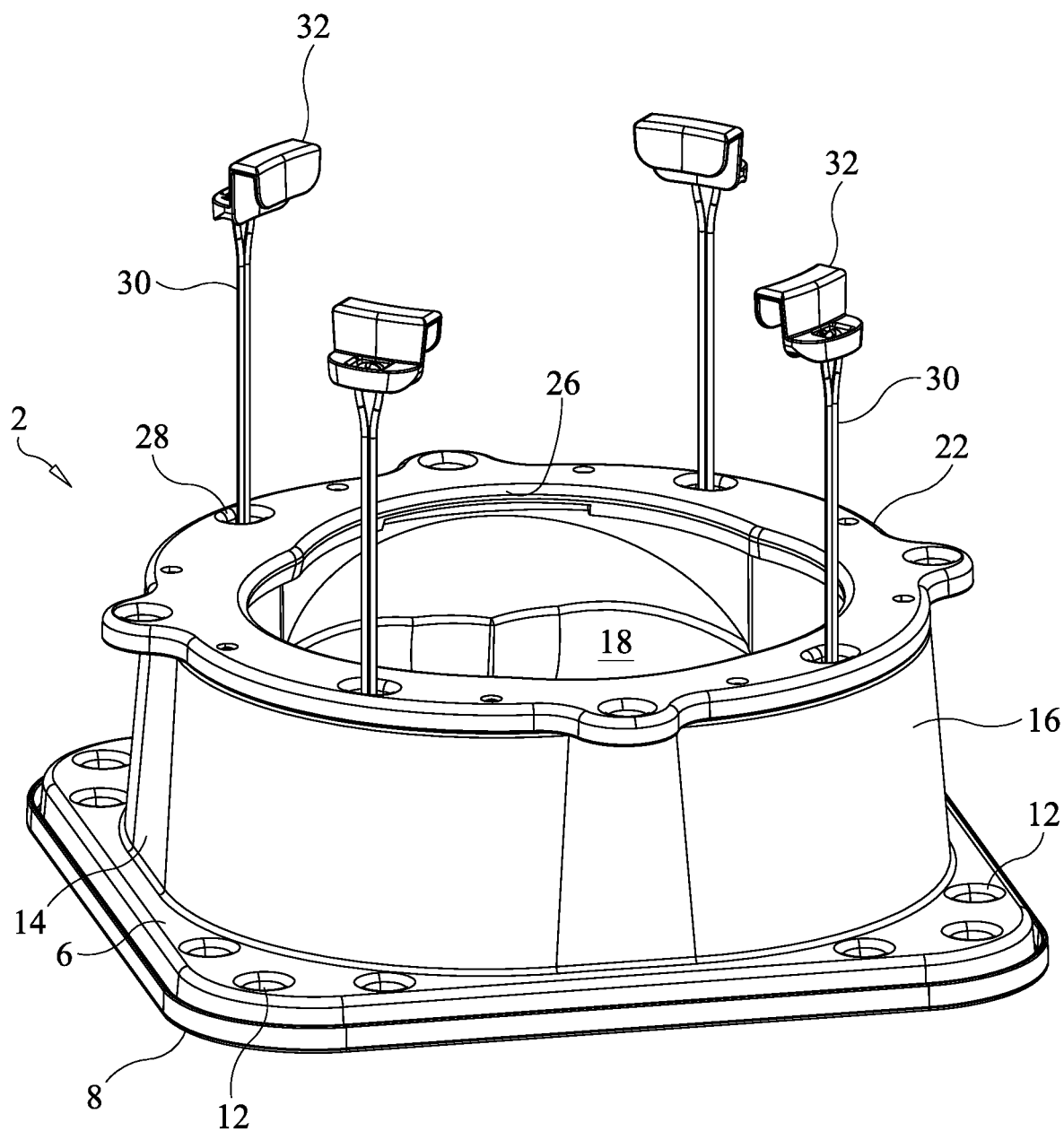
FIG. 2 is a top perspective view of the bucket holder shown in FIG. 1 of the drawings taken at a different viewing angle.
Figure 3:
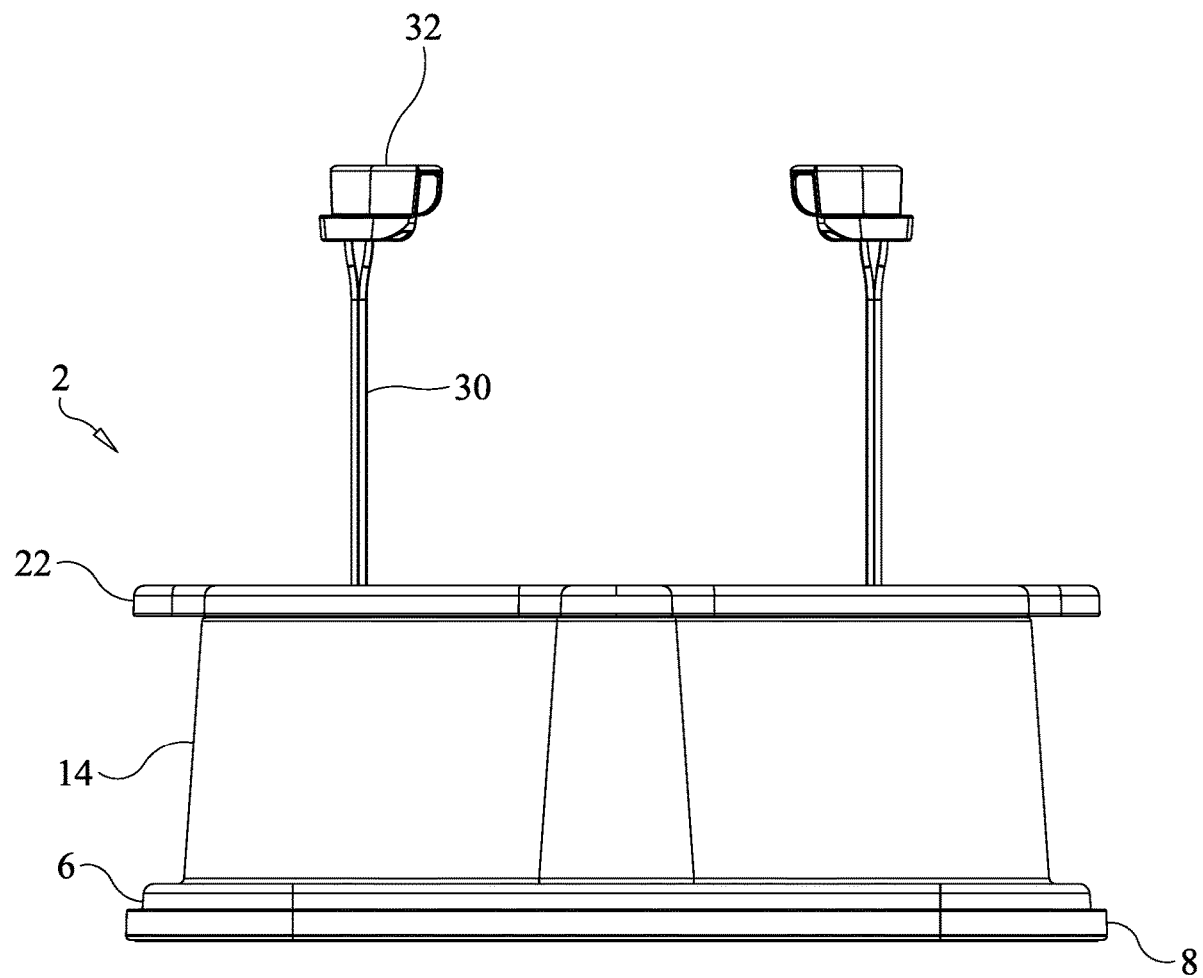
FIG. 3 is a side elevational view of the bucket holder of the present invention shown in FIGS. 1-2.
Figure 4:
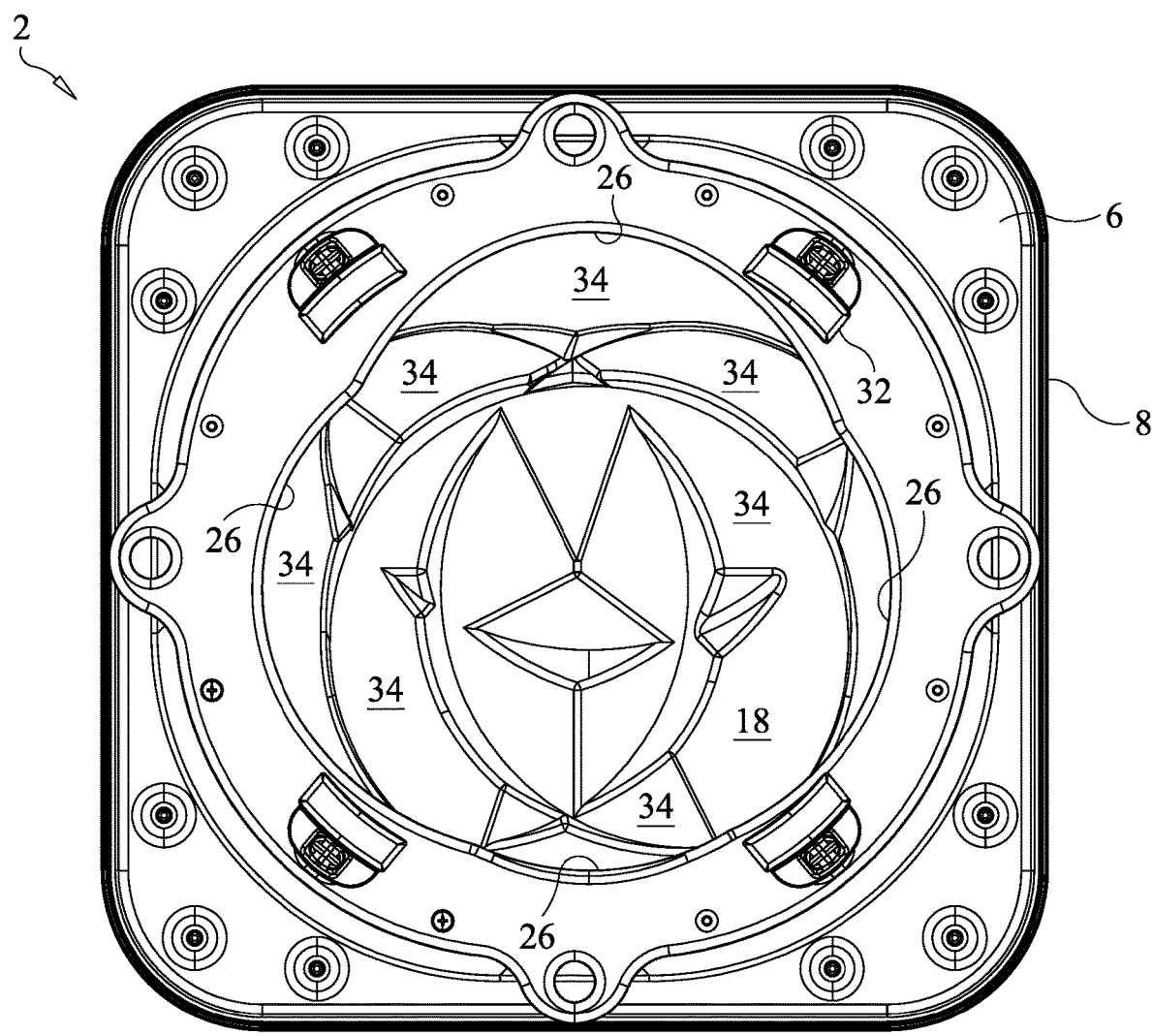
FIG. 4 is a top plan view of the bucket holder of the present invention shown in FIGS. 1-3.
Figure 5:
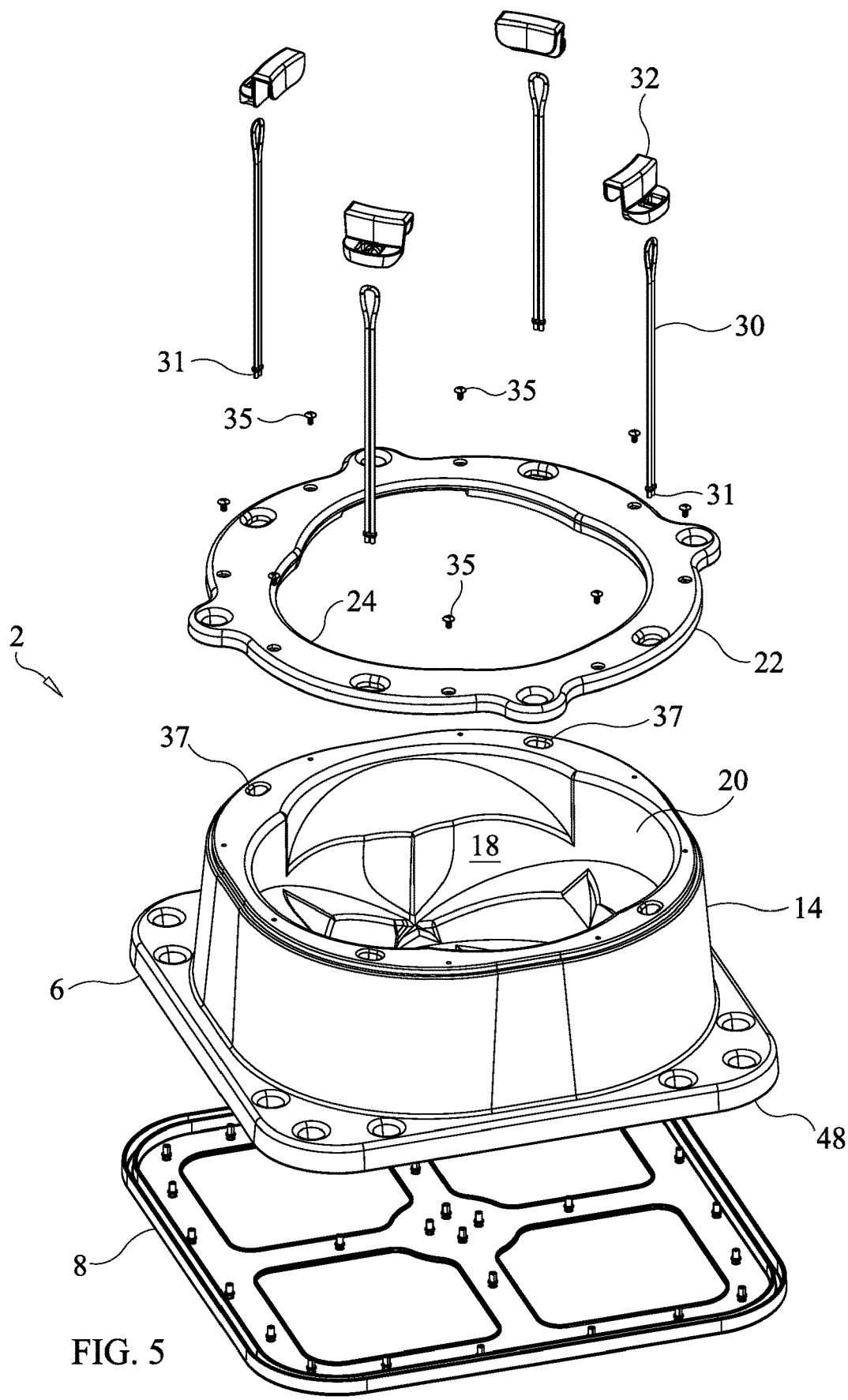
FIG. 5 is an exploded, perspective view of the bucket holder of the present invention shown in FIGS. 1-4.
Figure 6:
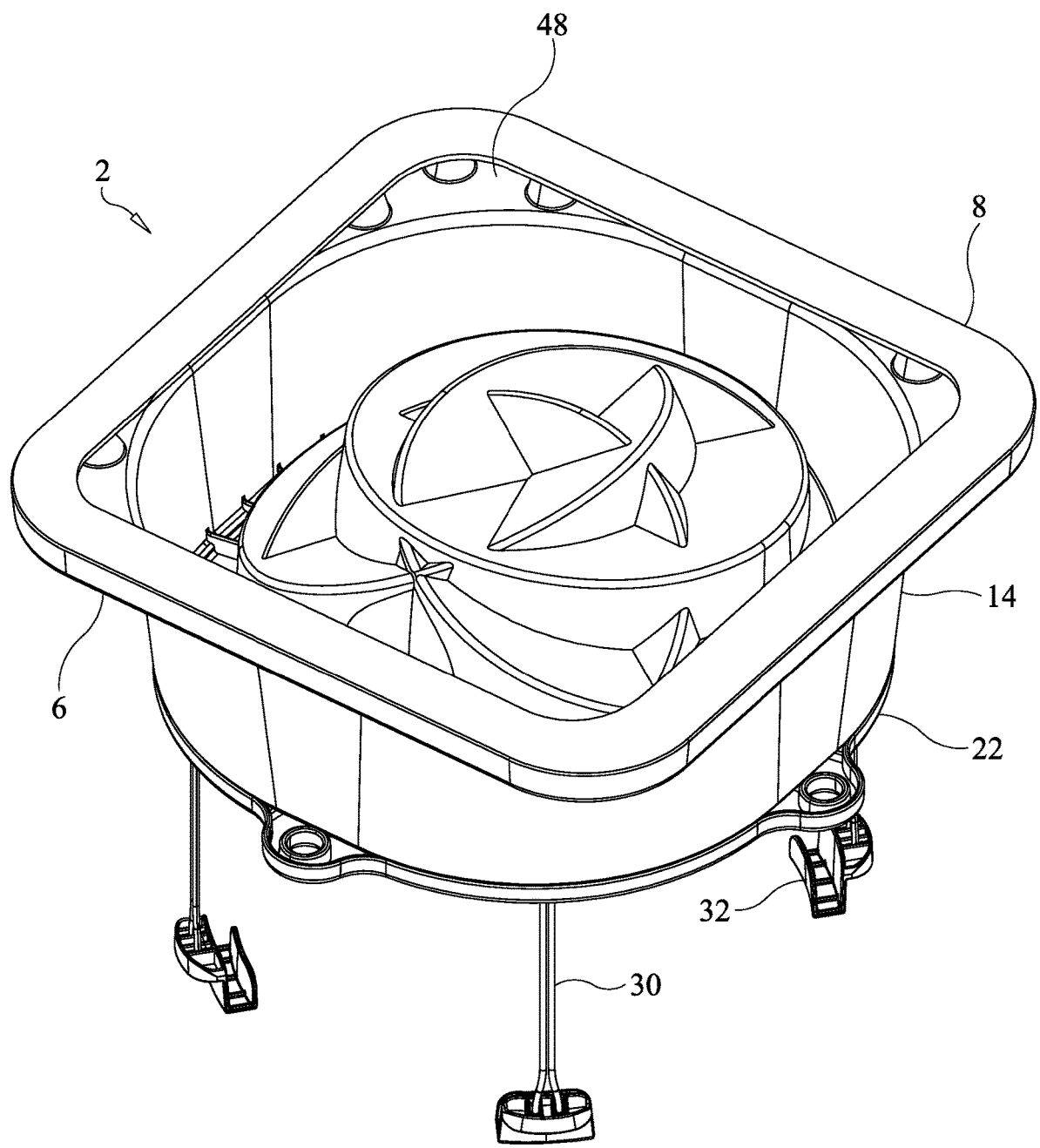
FIG. 6 is a bottom perspective view of the bucket holder of the present invention shown in FIGS. 1-5.
Figure 23:
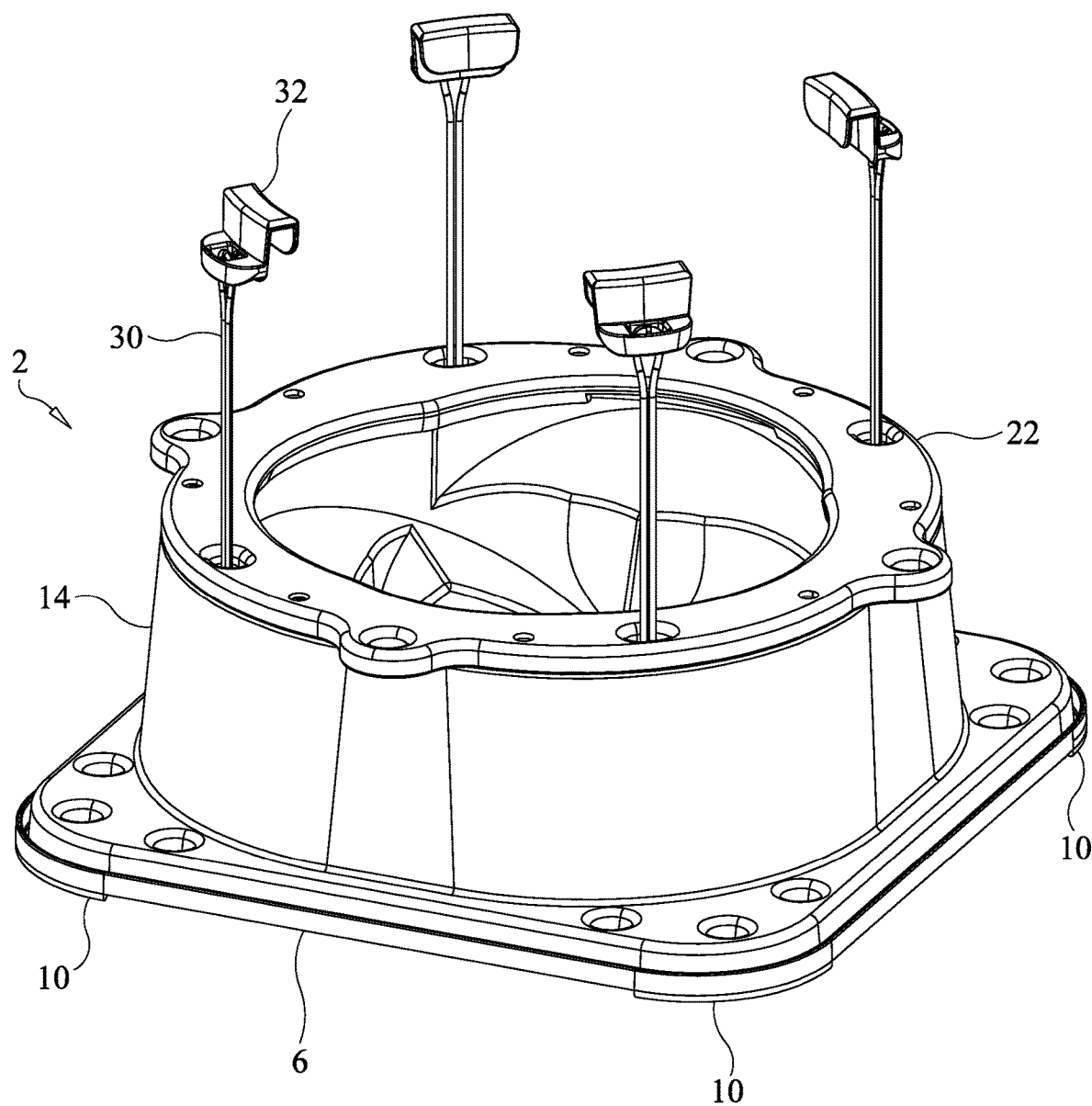
FIG. 23 is a top perspective view of a bucket holder constructed in accordance with a second form of the present invention.
Figure 24:
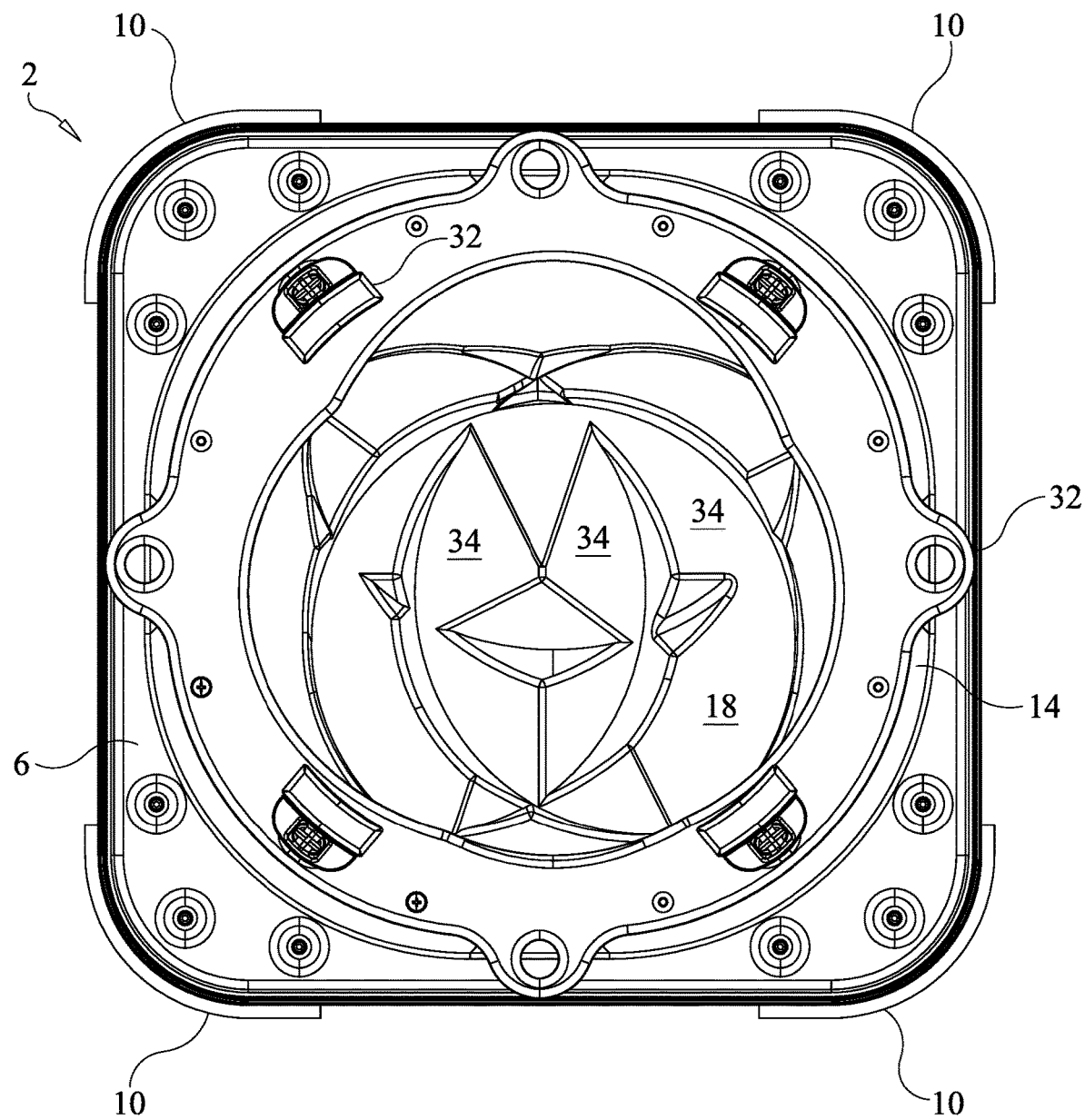
FIG. 24 is a top plan view of the bucket holder of the present invention shown in FIG. 23.
Figure 25:
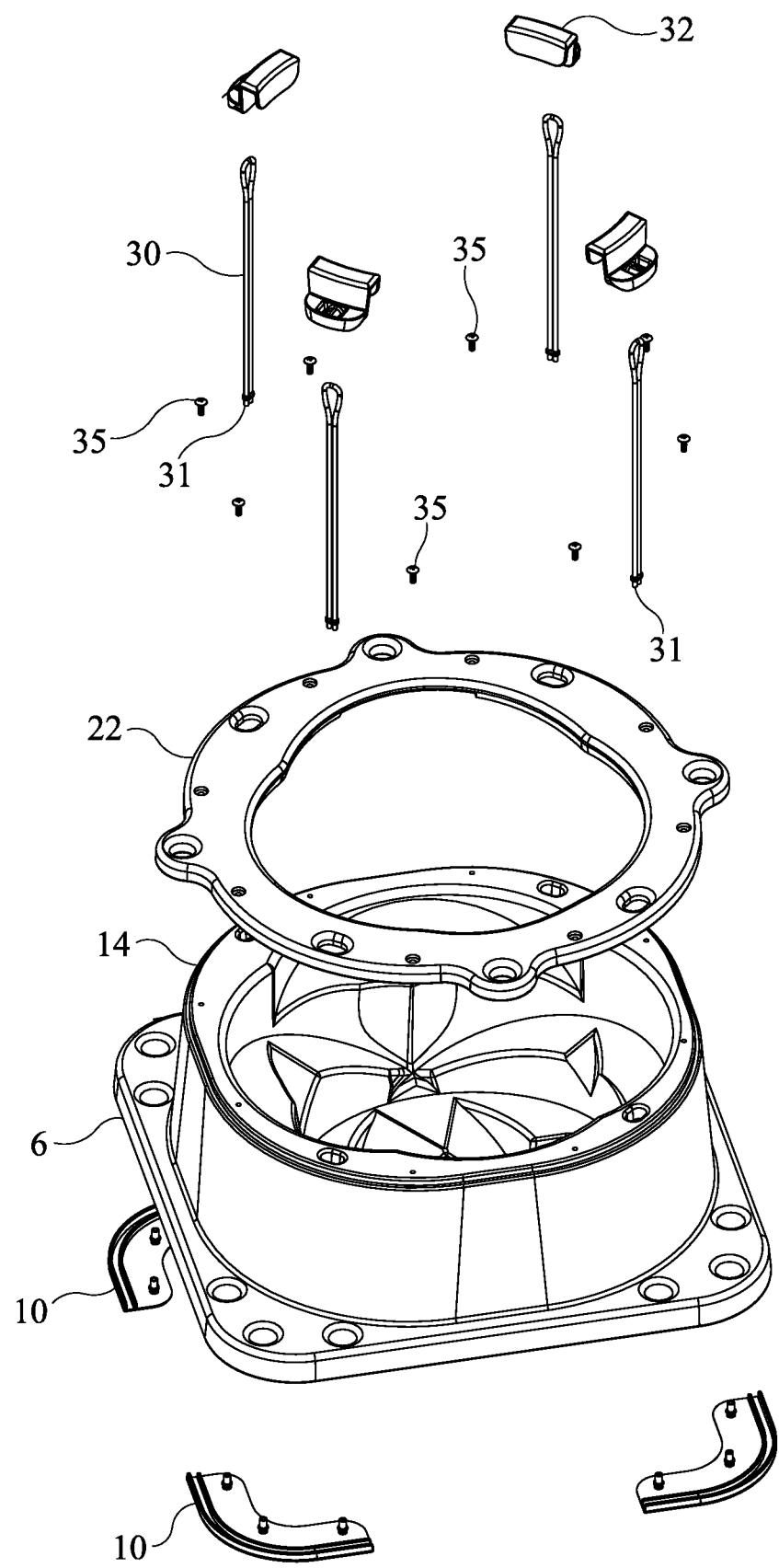
FIG. 25 is a top perspective, exploded view of the bucket holder of the present invention shown in FIGS. 23 and 24.

Reference should initially be had to FIGS. 1-9 of the drawings, where it will be seen that a bucket holder 2 constructed in accordance with one form of the present invention and used on a pitched roof to support a bucket 4 therein in an upright, vertical disposition, includes a generally planar, rectangular base 6 which is designed to rest on a pitched roof of a residential home or commercial building. The base 6 may be formed of thermoplastic material by injection molding. A footing 8 formed of rubberized or other anti-slip material is preferably attached to the underside of the base 6 to help prevent the bucket holder 2 of the present invention from slipping when placed on a pitched roof. In one form of the present invention, and as shown in FIG. 5 of the drawings, the rubberized footing 8 may be rectangular in shape, with a peripheral border and interconnected, transversely disposed cross members. Alternatively, the rubberized footing 8 may just include the outer peripheral border that is mounted to the peripheral portions of the base 6. In yet a further embodiment, the bucket holder 2 may include four rubberized, angled feet 10 that attach to the four corners of the base 6, as shown in FIGS. 23-25 of the drawings. The base 6 may include a plurality of openings 12 formed through the thickness thereof, at least some of which may be used for receiving cables or fasteners (not shown) to help secure the bucket holder 2 on a pitched roof.

A bucket supporting main canister 14 is mounted on the upper side of the base 6 and extends outwardly therefrom. The main canister 14 has a generally cylindrical shape defined by a side wall 16 and an inner, bucket supporting wall 18. The main canister 14 has a top opening 20 which receives a bucket 4 therein, the bottom of the bucket resting on the inner support wall 18 of the main canister 14. A top ring 22, also provided for supporting a bucket 4 on the bucket holder 2, is mounted on the main canister 14 at the top opening 20 thereof. The top ring 22 includes a central opening 24 formed through the thickness thereof which is in communication with the top opening 20 formed in the main canister 14 and which also receives therethrough a portion of the bucket 4 placed in the bucket holder 2. As can be seen from the drawings, the top ring 22 includes arcuate edge portions 26 formed with relatively different radii which define the central opening 24 formed in the top ring 22.

These arcuate edge portions 26 are used to help support a bucket 4 received by the bucket holder 2 of the present invention such that a portion of the side wall of a bucket 4 received by the holder 2 will rest against and be supported by one of the arcuate edge portions 26 of the top ring 22, which helps hold the bucket 4 in an upright, vertical disposition when the bucket holder 2 is used on a pitched roof.

Figure 27:
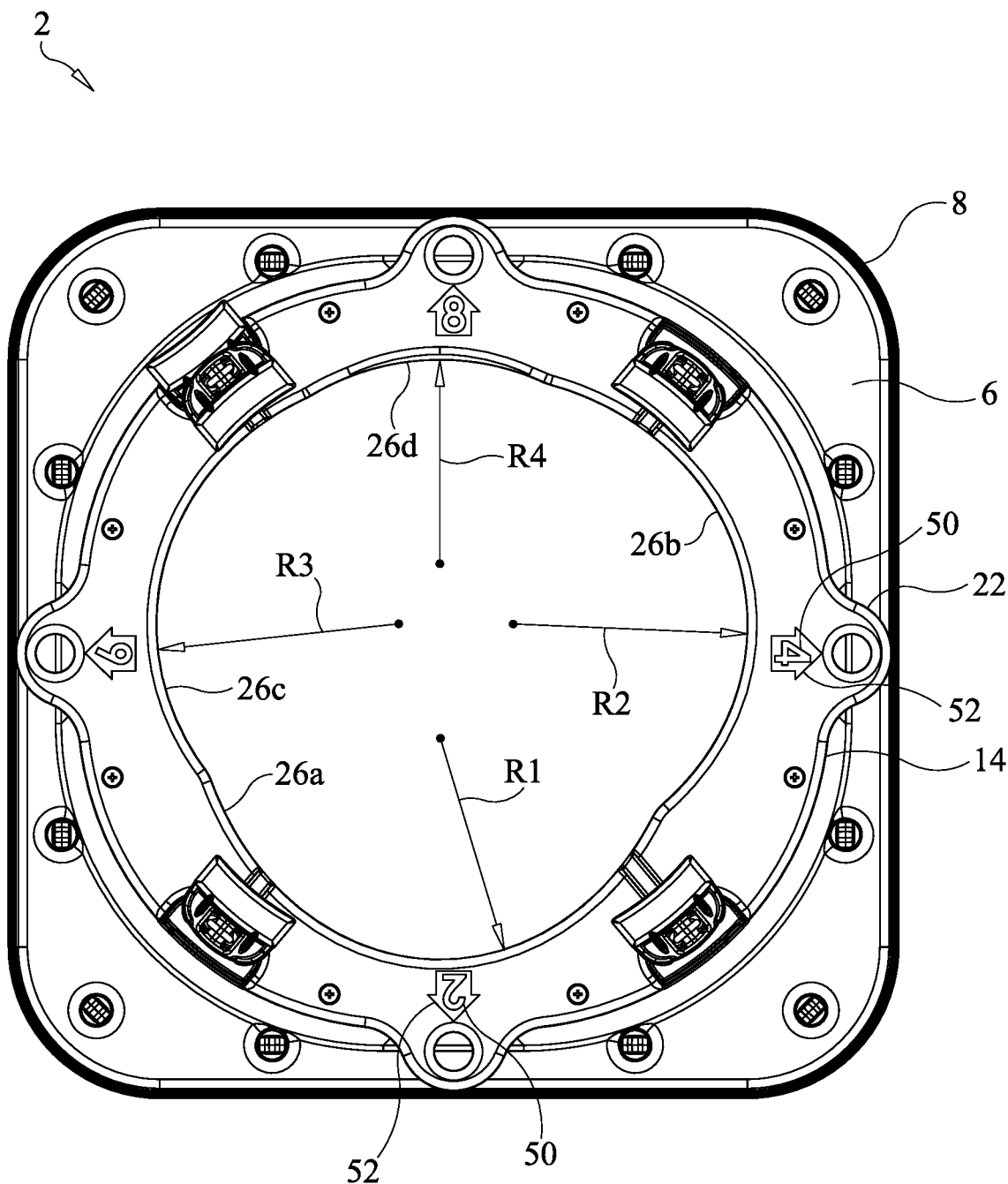
FIG. 27 is a top plan view of the bucket holder of the present invention shown in FIG. 26, and illustrating the preferred radii of the arcuate edge portions of the top ring of the bucket holder.

Even more preferably, because a typical five gallon bucket, which a preferred form of the bucket holder of the present invention is designed to hold, is radially outwardly tapered towards its top opening so that the buckets may be stacked one inside another, the arcuate edge portions of the top ring are formed as ellipses defined by different radii emanating from respective off-center locations within the central opening 24 formed in the top ring, as shown in FIG. 27 of the drawings, so that the tapered side wall of the bucket rests against most of a respective selected arcuate edge portion 26 of the top ring when the bucket holder is used on a pitched roof. More specifically, for use of the bucket holder on a roof having a $2/12$ pitch, a first arcuate edge portion 26a is formed in the top ring 22 with an off-center radius R1 equal to or about 4.78810 inches. Similarly, for use of the bucket holder on a roof having a $4/12$ pitch, a second arcuate edge portion 26b is formed with a different off-center radius R2 equal to or about 5.04666 inches. Likewise, for use of the bucket holder on a roof having a $6/12$ pitch, a third arcuate edge portion 26c is formed with still a different off-center radius R3 equal to or about 5.25213 inches. Also, for use of the bucket holder on a roof having an $8/12$ pitch, a fourth arcuate edge portion 26d is formed with yet another different off-center radius R4 equal to or about 5.36591 inches.

Figure 7:
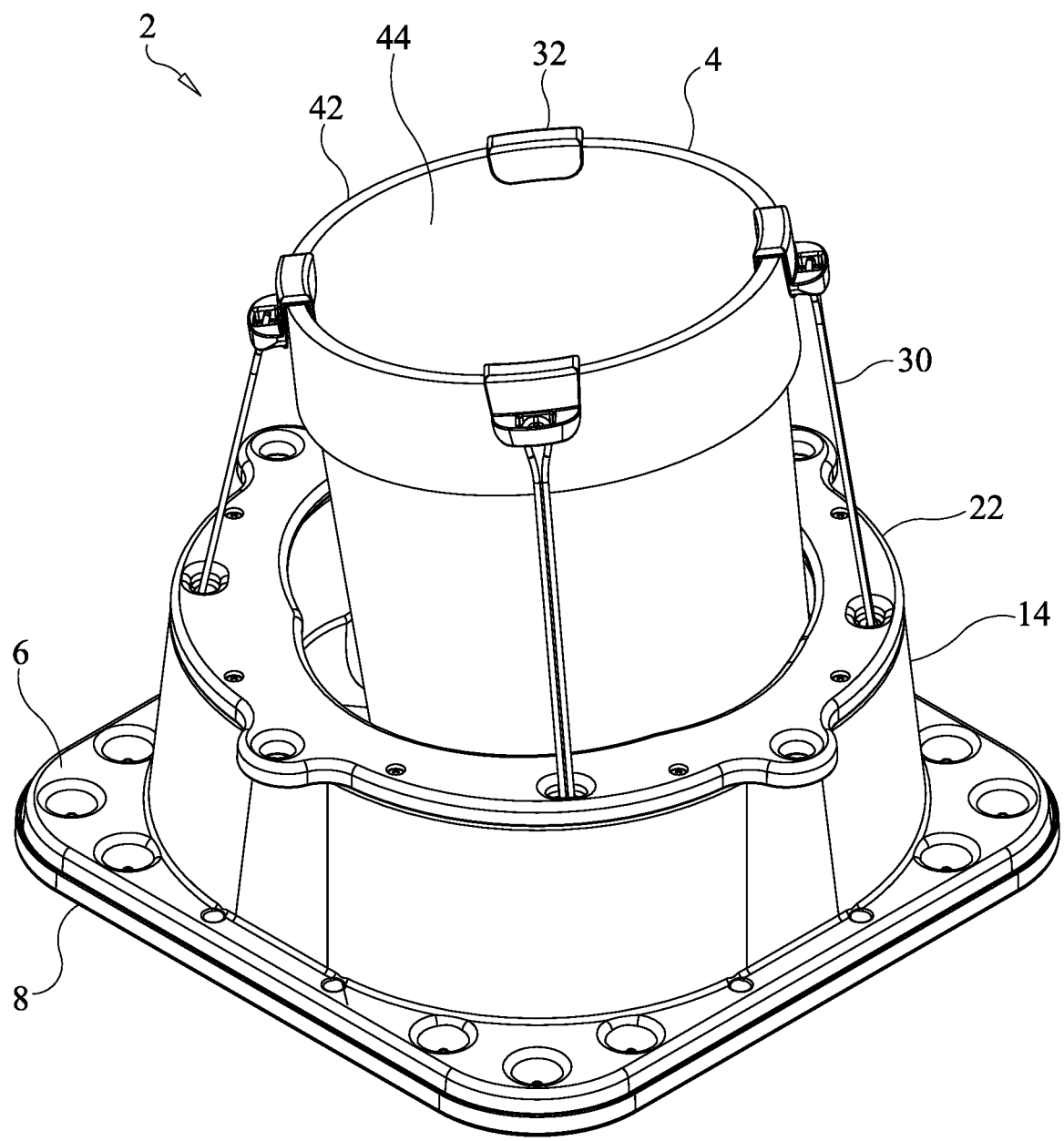
FIG. 7 is a perspective view of the bucket holder of the present invention shown in FIGS. 1-6, and illustrating the bucket holder securing a bucket thereto.
Figure 8:
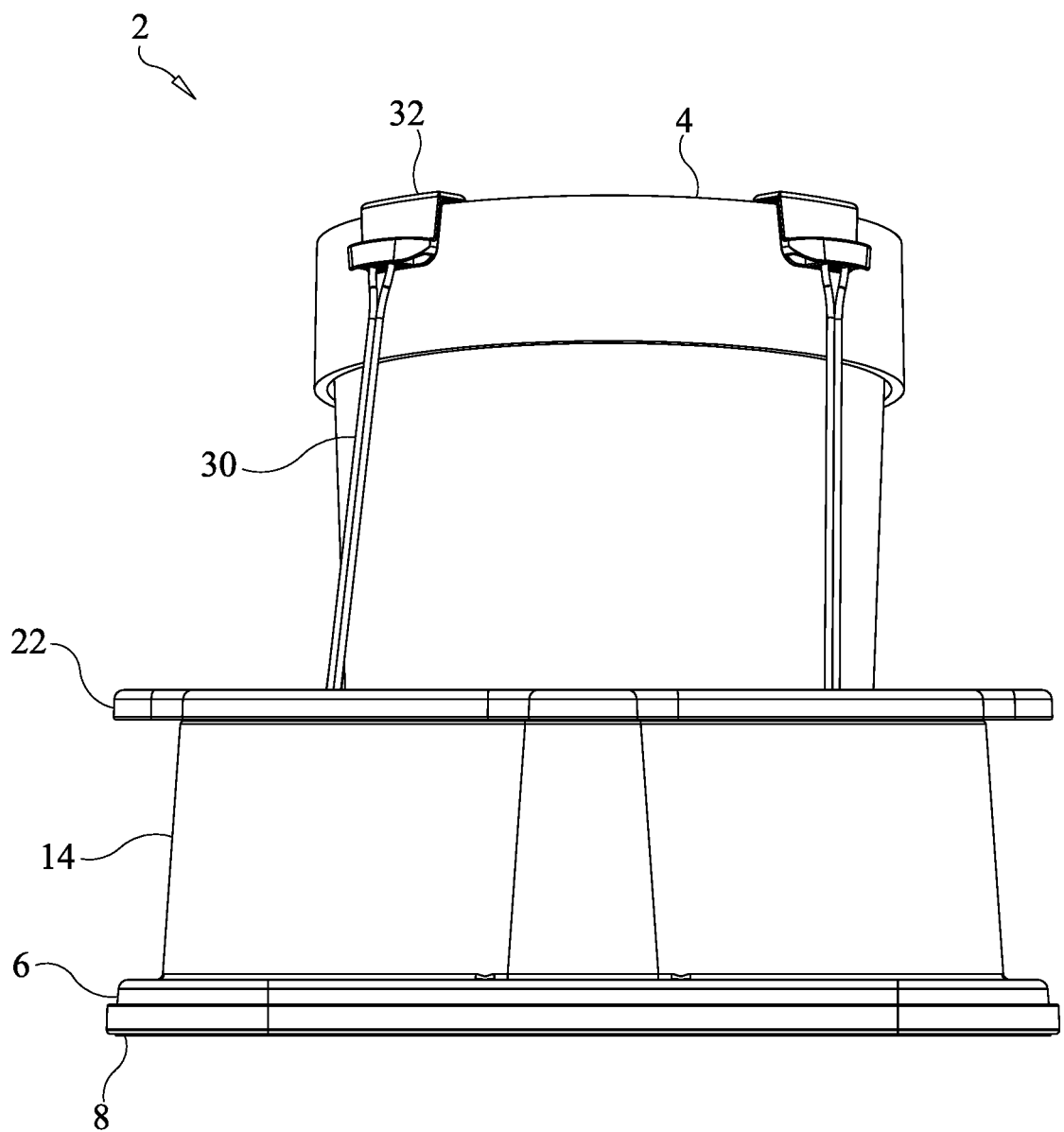
FIG. 8 is a side elevational view of the bucket holder of the present invention shown in FIGS. 1-7, and illustrating the bucket holder securing a bucket thereto.
Figure 9:
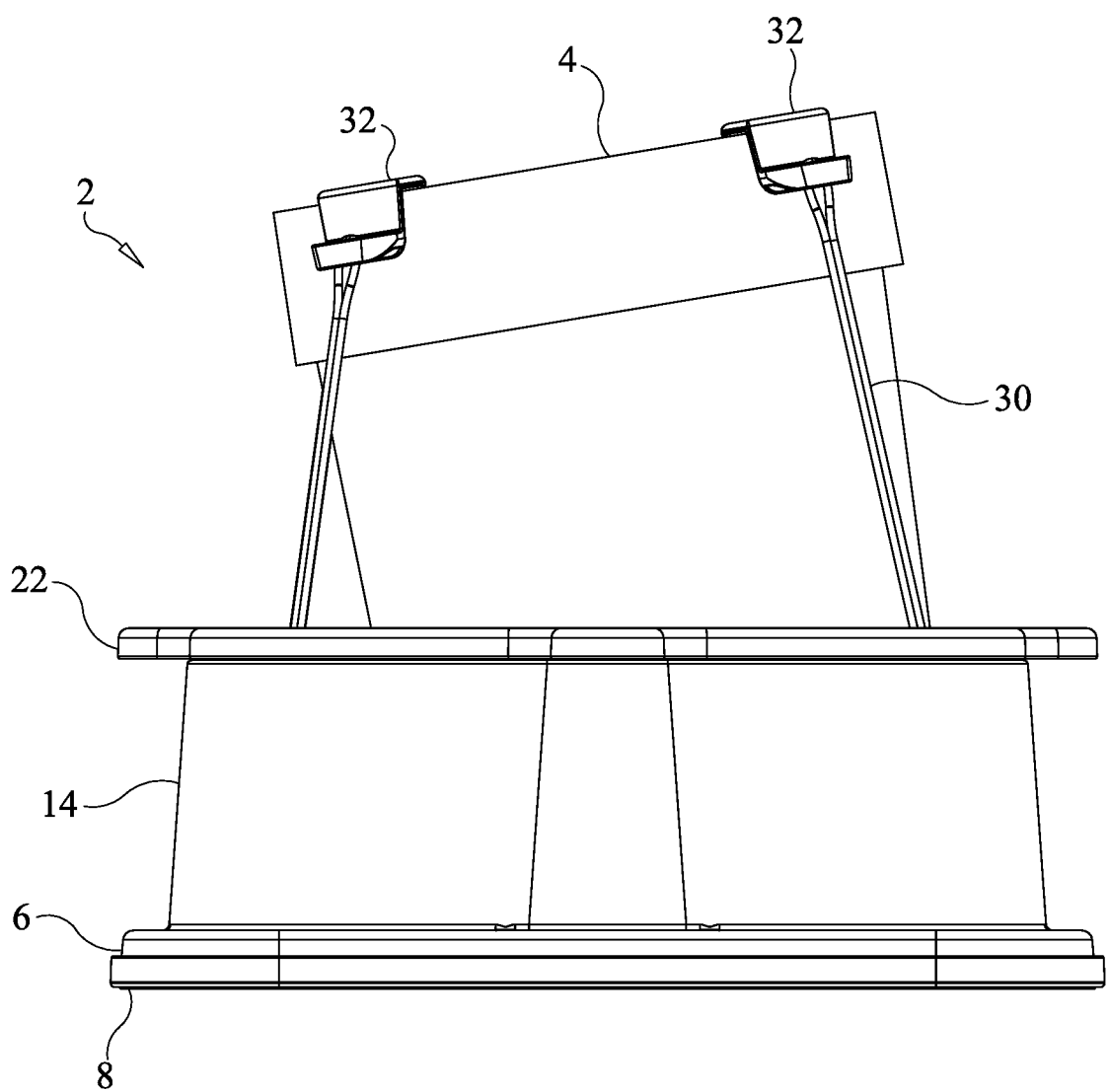
FIG. 9 is a side elevational view of the bucket holder of the present invention shown in FIGS. 1-8, and illustrating the bucket holder securing a bucket thereto.
Figure 10A:
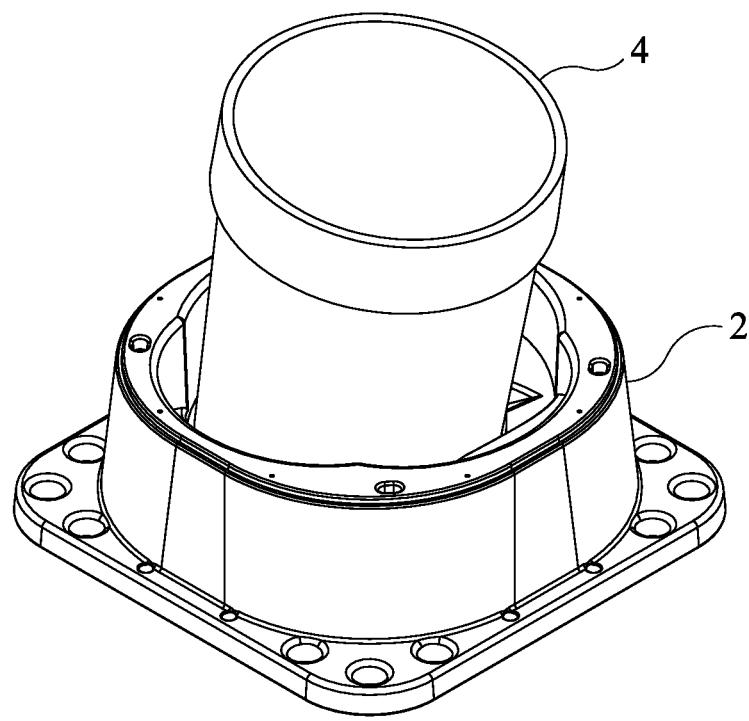
FIGS. 10a-10d are perspective views of the bucket holder of the present invention shown disposed at various angles to accommodate roofs having pitches of $2/12$, $4/12$, $6/12$ and $8/12$, respectively, and illustrating a bucket supported thereby in an upright, vertical disposition.
Figure 10B:
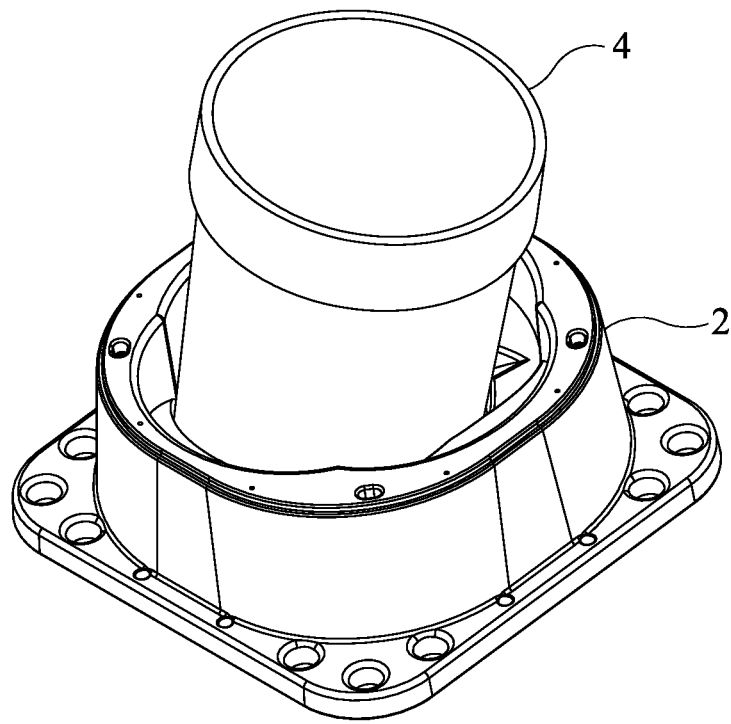
Figure 10C:
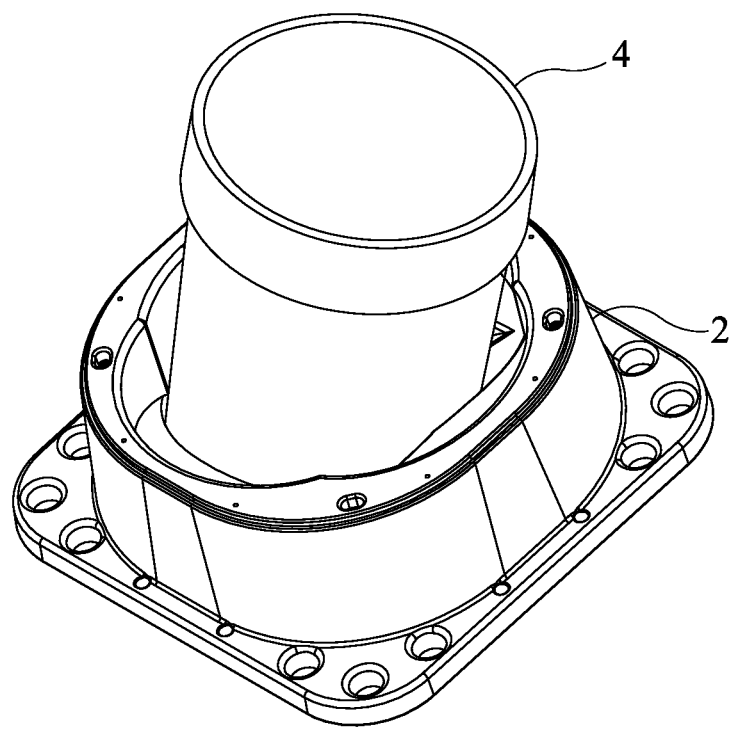
Figure 10D:
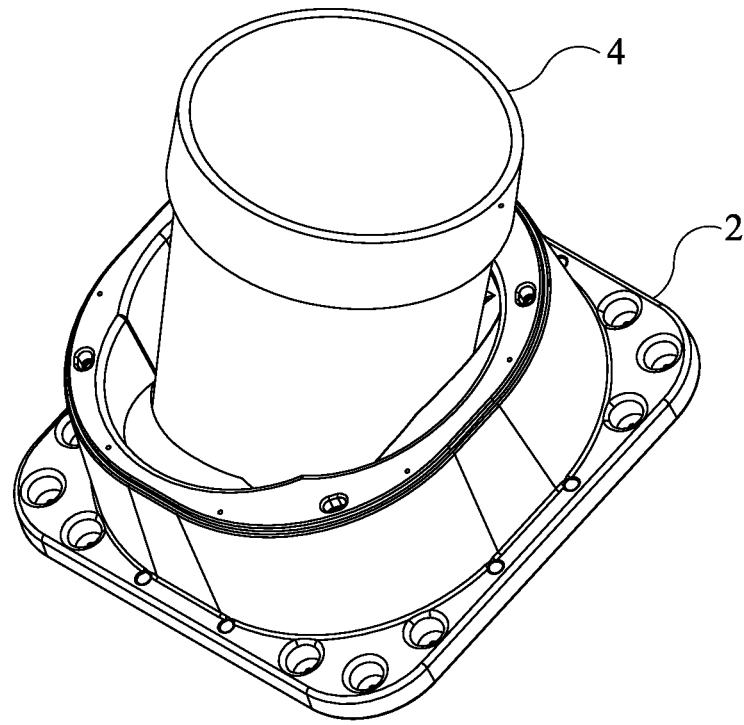
Figure 10E:
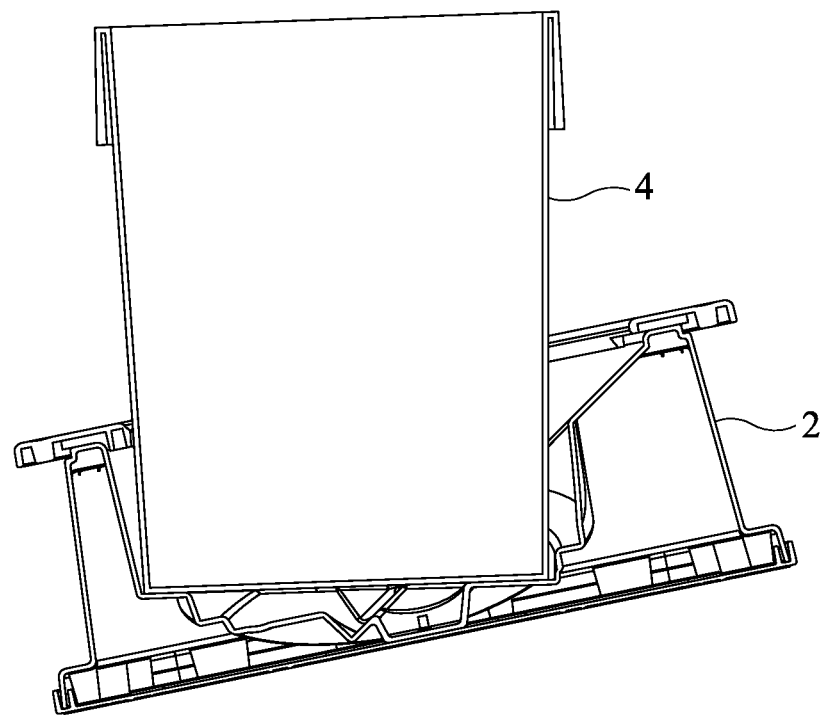
FIGS. 10e-10h are cross-sectional views of the bucket holder of the present invention shown disposed at various angles to accommodate roofs having pitches of $2/12$, $4/12$, $6/12$ and $8/12$, respectively, and illustrating a bucket supported thereby in an upright, vertical disposition.
Figure 10F:
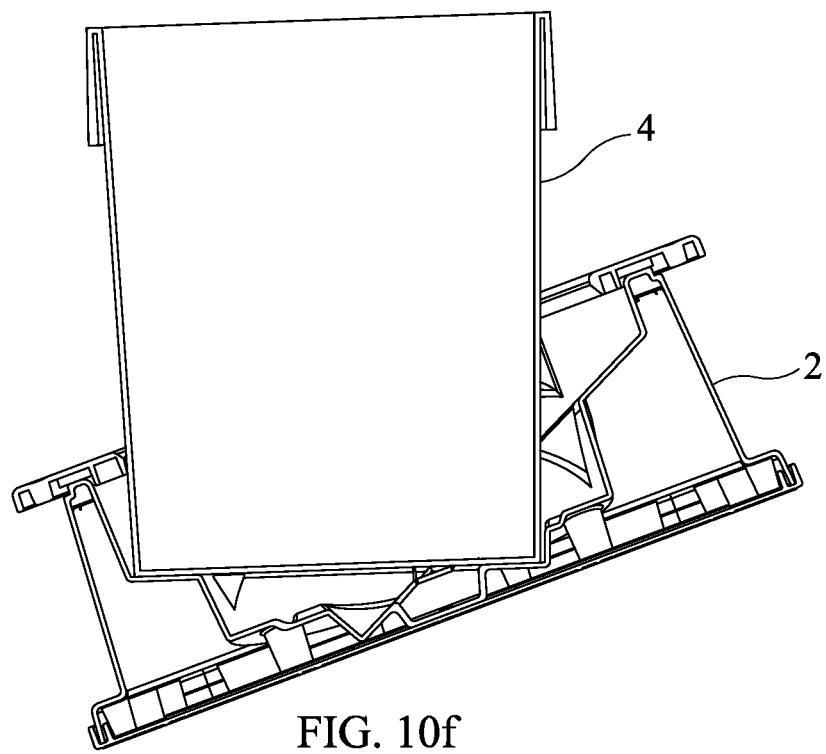
Figure 10G:
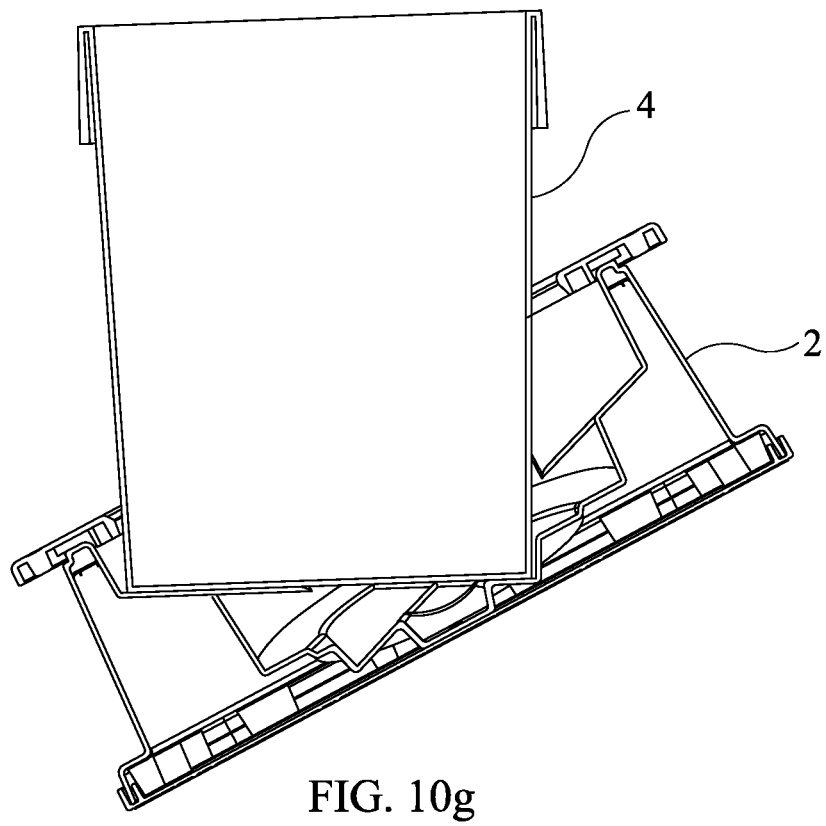
Figure 10H:
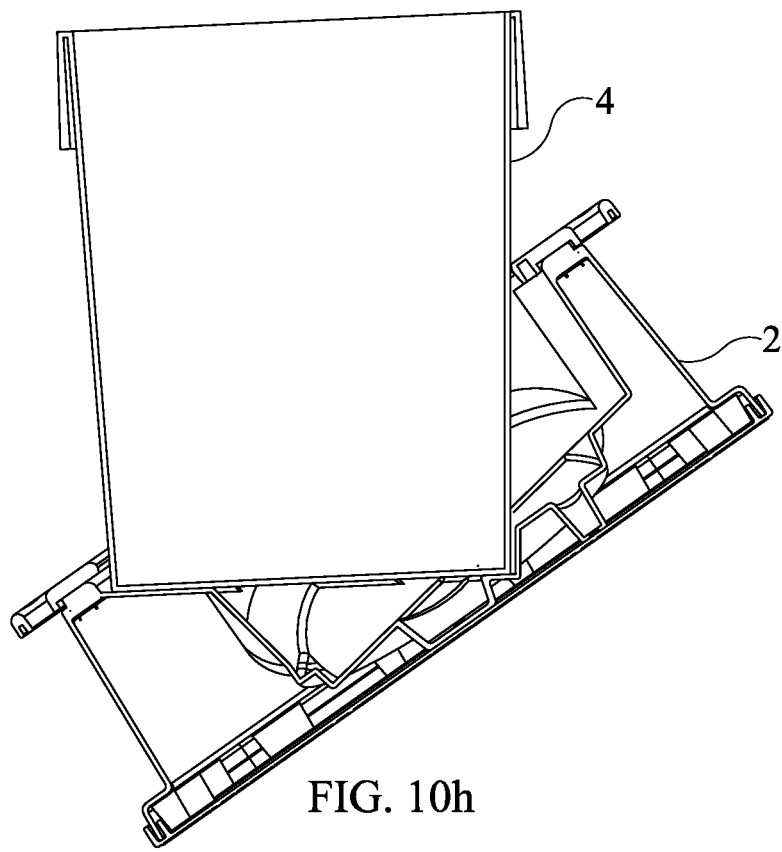

The top ring 22 also includes a plurality of openings 28 formed through the thickness thereof. These openings 28 are provided to receive the ends of bungee cords 30 or other elastic straps that pass therethrough, the lower axial ends thereof being knotted to form elastic cord knots 31 so that the bungee cords 30 are captivity received in their respective openings 28 formed in the top ring 22 of the bucket holder 2. The opposite, upper axial end of each bungee cord 30 has mounted thereon a U-shaped clip 32. The U-shaped clip 32 is provided to engage the upper rim of a bucket 4 placed in the bucket holder 2 of the present invention and supported thereby. Thus, the bungee cords 30 and the U-shaped clips 32 help secure a bucket 4 within the bucket holder 2 of the present invention, as illustrated by FIGS. 7-9 of the drawings. There are also anchor loop holes 33 formed in the top ring 22 (see FIG. 2). A cable, strap or rope (not shown) may be attached at one end to the roof peak, chimney and the like and at the other end to the anchor loop holes to help secure the bucket holder 2 to the roof on which it is used. The top ring 22 is preferably secured to the top side of the main canister 14 with a plurality of screws 35. There is a plurality of openings 37 in the top side of the main canister 14 which are in alignment with the elastic cord-receiving openings 28 formed in the top ring 22. If, in one embodiment of the bucket holder 2 of the present invention, the top ring 22 is omitted such that the bucket holder includes just the main canister 14, or the main canister 14 and the planar base 6, these openings 37 may function not only for receiving the knotted ends of the elastic cords 30 but also for receiving cables, straps or ropes (not shown) to help secure the bucket holder 2 on the pitched roof.

As can be seen from FIGS. 1-9 of the drawings, and as mentioned previously, the bucket holder 2 of the present invention includes a multi-faceted, inner, bucket supporting wall 18. This bucket supporting wall 18 is formed of a plurality of segments 34 having different relative heights and angles. When a bucket 4 is placed in the main canister 14 of the bucket holder 2 in a desired position, the bottom of the bucket 4 rests on one or more of these segments 34 such that the bucket 4 is supported thereby in an upright, vertical disposition when the bucket holder 2 is used on a pitched roof. Thus, the bucket 4 is placed in the holder 2 to rest on selected segments 34 based on the pitch of the roof on which the bucket holder 2 is used. This allows the bucket 4 to be supported by the holder 2 in an upright, vertical disposition to prevent the contents thereof from spilling.

The segments 34 are provided with relative heights and angles such that a bucket 4 supported by the holder 2 will be held in upright, vertical dispositions on roofs with the most common pitches, including pitches of $2/12$, $4/12$, $6/12$ and $8/12$, where the numerator and denominator respectively represent the vertical change in height of the roof (e.g., two feet) over a predetermined horizontal distance or length (e.g., twelve feet).

Figure 11:
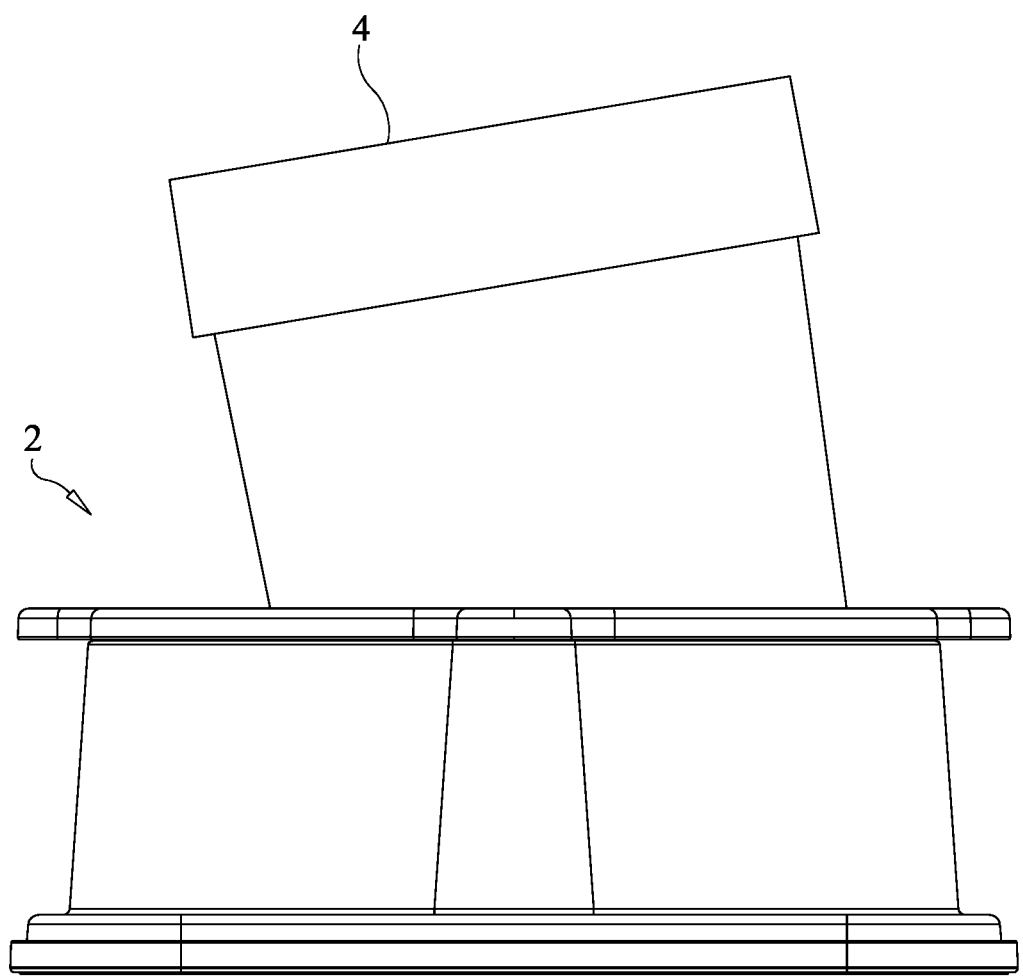
FIG. 11 is a side elevational view of the bucket holder of the present invention shown in FIGS. 1-9, and illustrating a bucket held thereby in an upright, vertical disposition when the bucket holder is used on a roof having a pitch of $2/12$.
Figure 12:
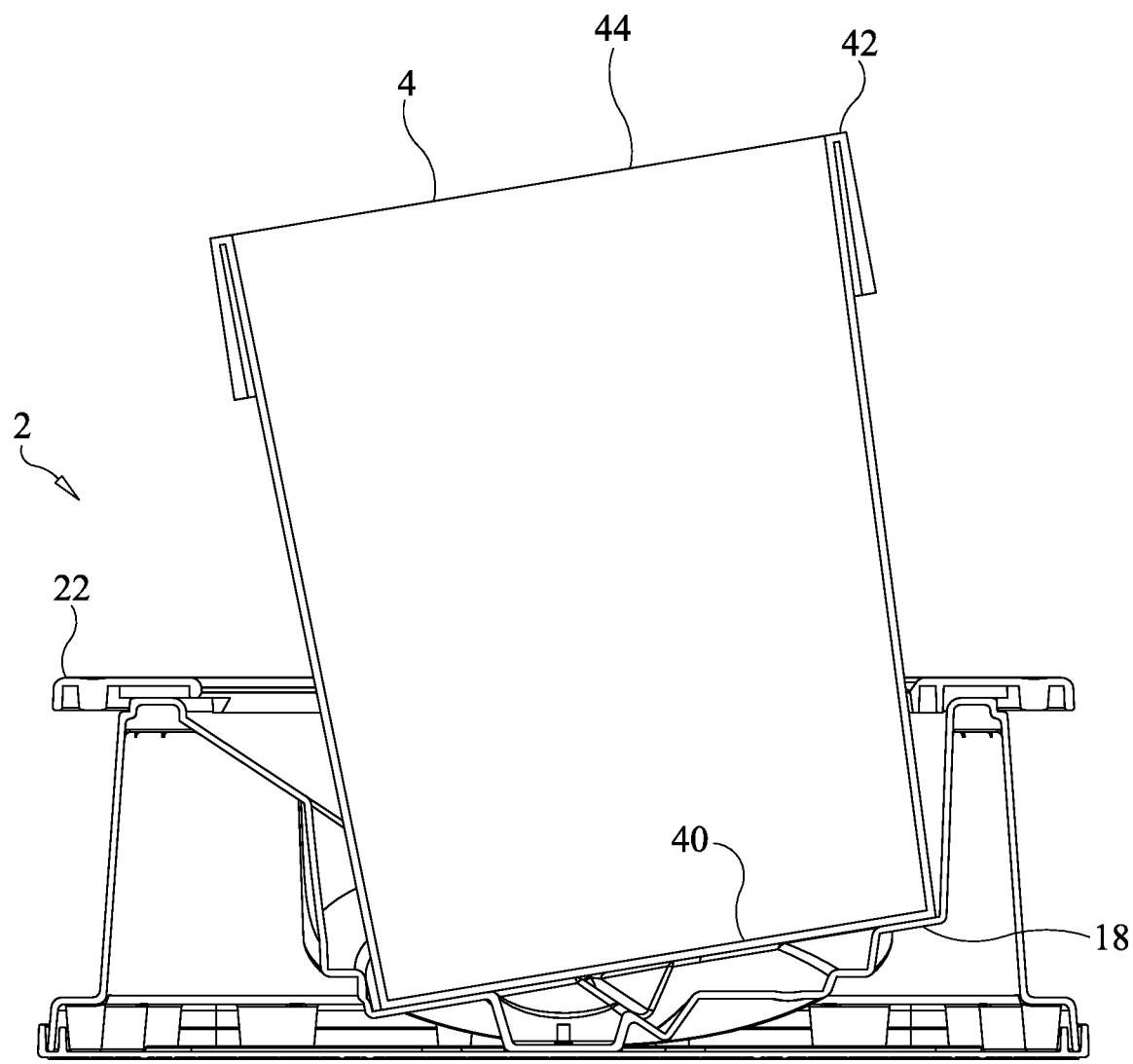
FIG. 12 is a cross-sectional view of the bucket holder of the present invention shown in FIGS. 1-9, and illustrating a bucket held thereby in an upright, vertical disposition when the bucket holder is used on a roof having a pitch of $2/12$.
Figure 13:
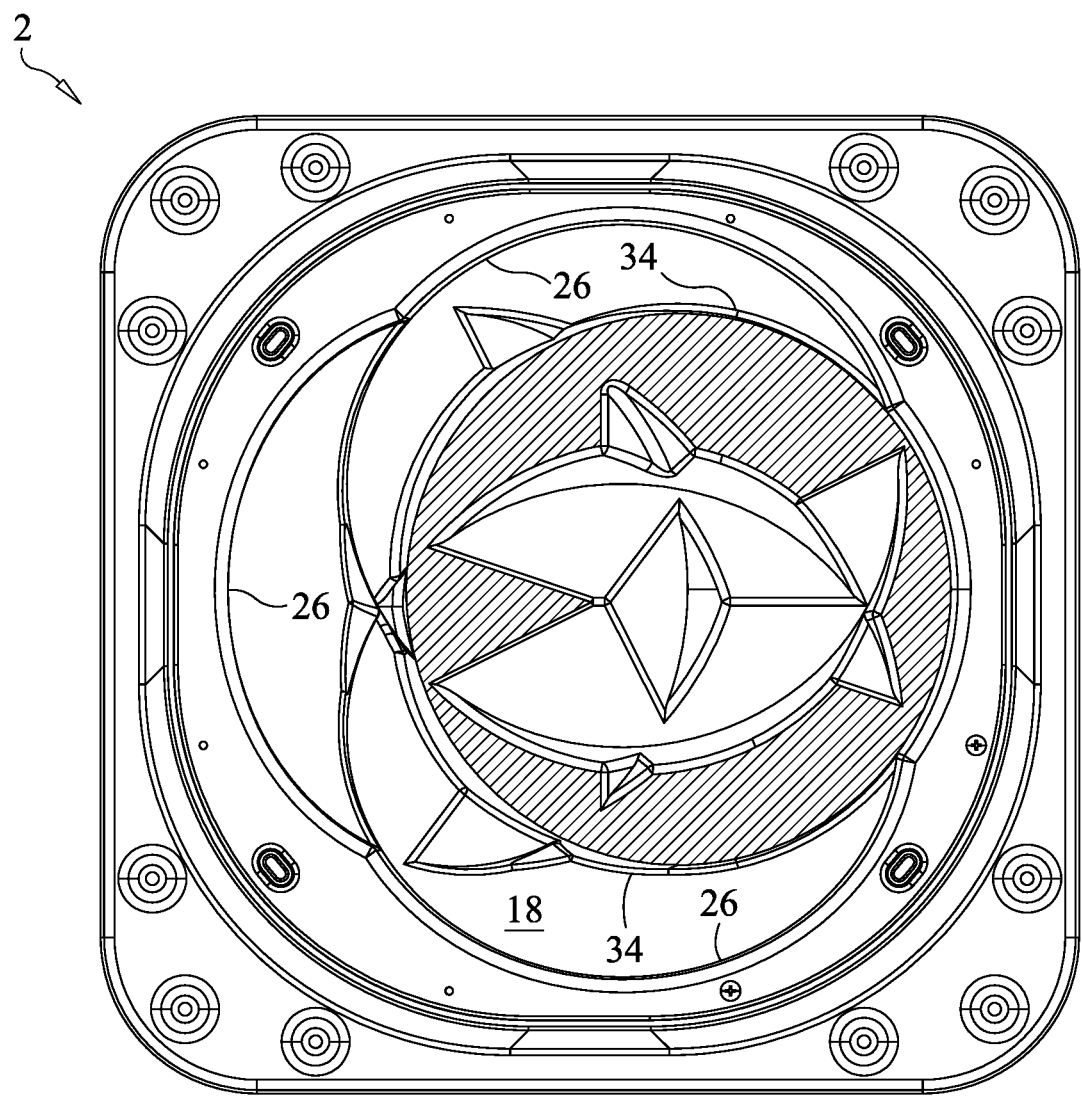
FIG. 13 is a top plan view of the bucket holder of the present invention shown in FIGS. 1-9, with the top ring thereof removed to facilitate a view of the multi-faceted, inner, bucket supporting wall thereof, and illustrating the segments of the inner wall on which a bucket will rest when the bucket holder is used on a roof having a pitch of 3/12.

Reference should now be had to FIGS. 10a-10h, and FIGS. 11-22, which illustrate the bucket holder 2 of the present invention supporting a bucket 4 in an upright, vertical disposition on roofs having pitches of $2/12$, $4/12$, $6/12$ and $8/12$. More specifically, FIGS. 11-13 illustrate the bucket holder 2 of the present invention for use on a roof with a pitch of $2/12$ and supporting a bucket 4 therein in an upright, vertical disposition. The segments 34 of the inner wall 18 shown in FIG. 13 that are illustrated with hatched lines are the segments 34 on which the bottom of the bucket 4 rests when the bucket holder 2 is used on a roof having a $2/12$ pitch. A roof with a $2/12$ pitch slopes at an angle of about 9.46 degrees. Therefore, the segments 34 illustrated with hatched lines in FIG. 13 are similarly angled at about 9.46 degrees in a direction opposite to the slope of the roof on which the bucket holder of the present invention is used.

Figure 14:
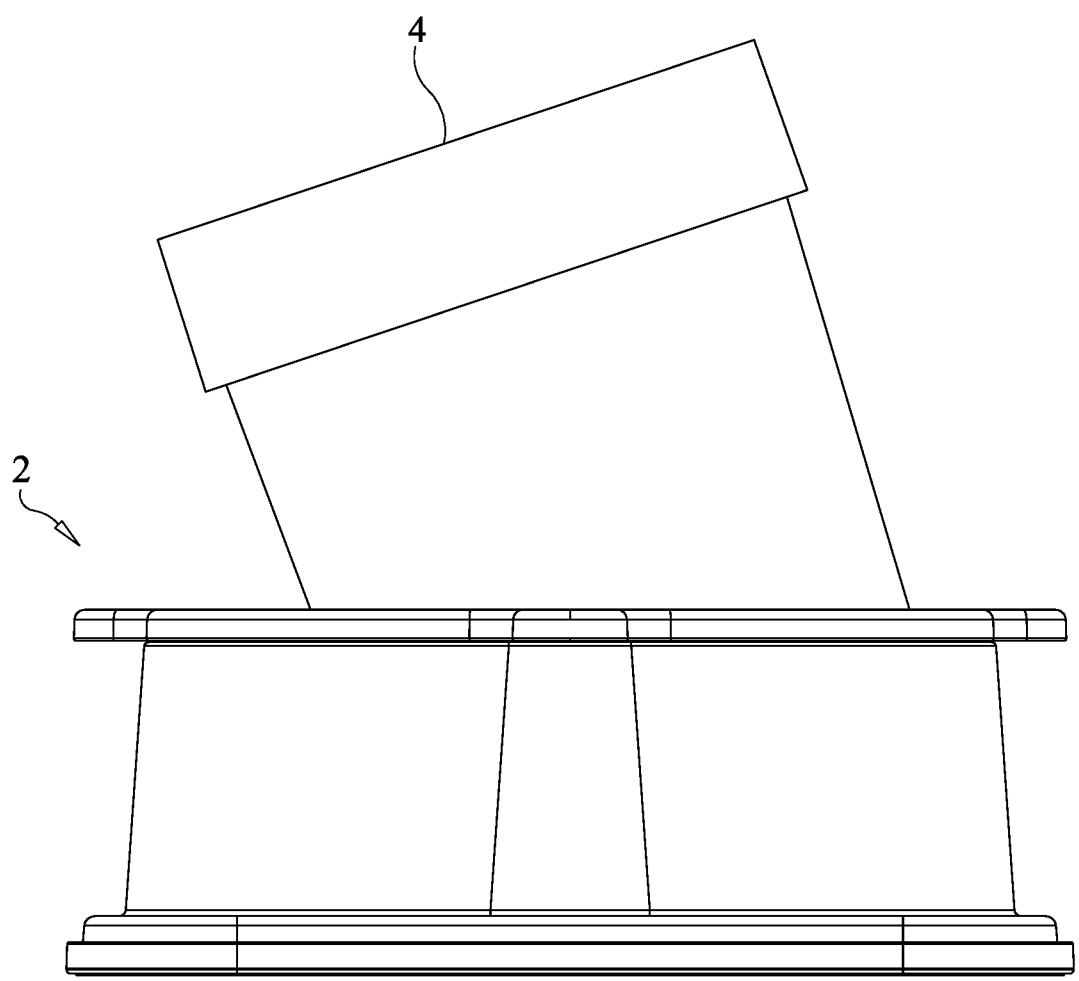
FIG. 14 is a side elevational view of the bucket holder of the present invention shown in FIGS. 1-9, and illustrating a bucket held thereby in an upright, vertical disposition when the bucket holder is used on a roof having a pitch of 4/12.
Figure 15:
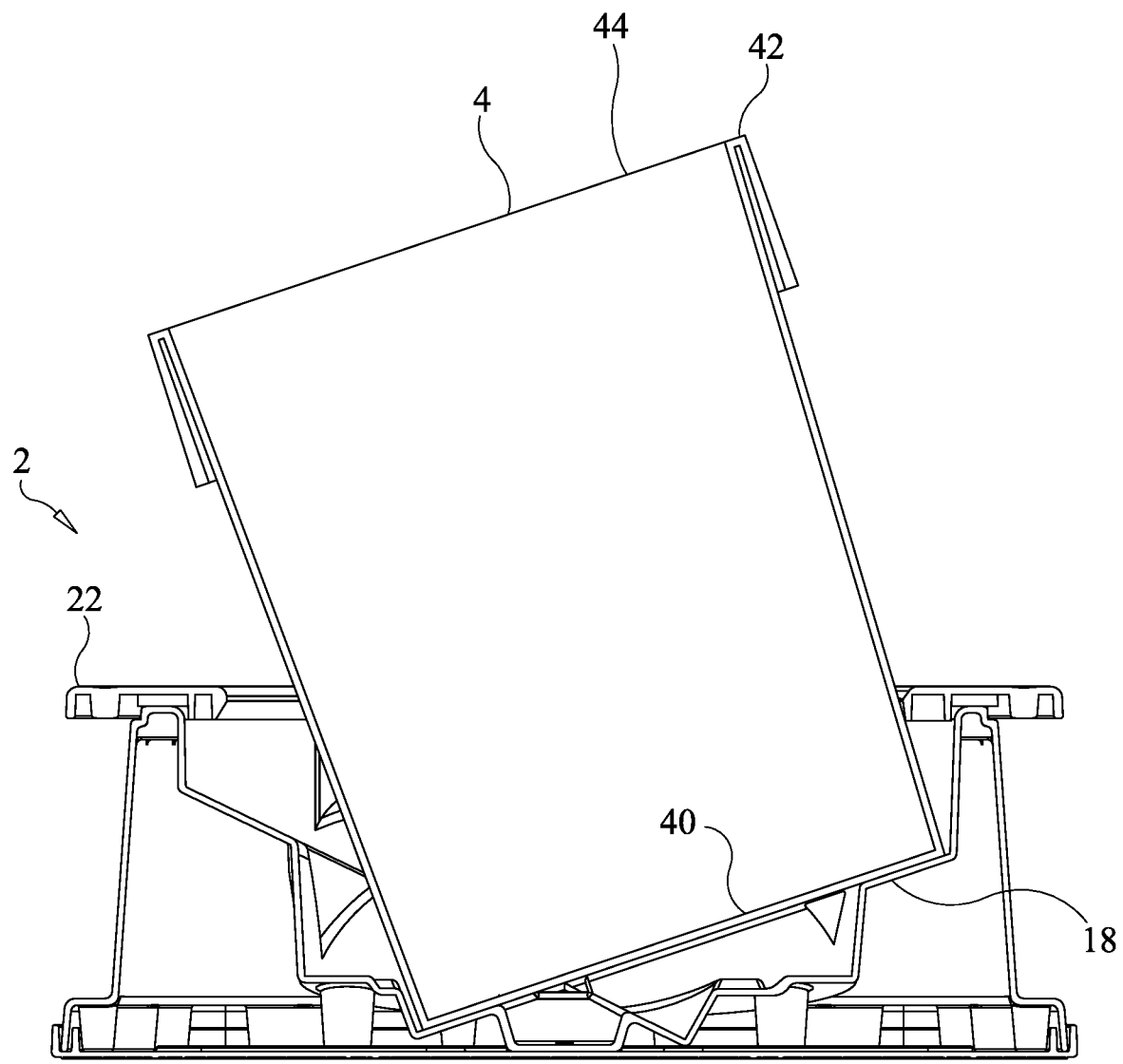
FIG. 15 is a cross-sectional view of the bucket holder of the present invention shown in FIGS. 1-9, and illustrating a bucket held thereby in an upright, vertical disposition when the bucket holder is used on a roof having a pitch of 4/12.
Figure 16:
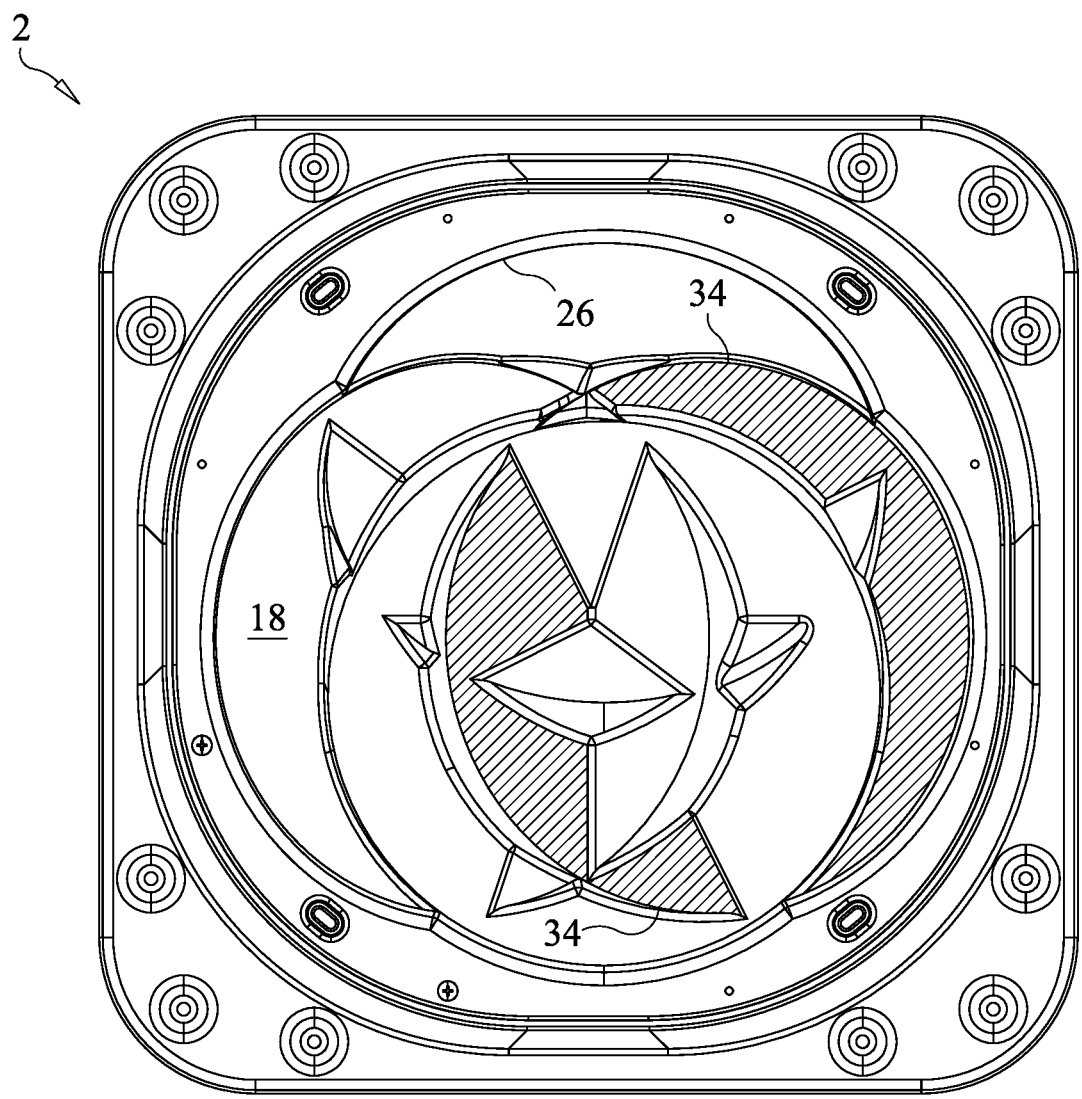
FIG. 16 is a top plan view of the bucket holder of the present invention shown in FIGS. 1-9, with the top ring thereof removed to facilitate a view of the multi-faceted, inner, bucket supporting wall thereof, and illustrating the segments of the inner wall on which a bucket will rest when the bucket holder is used on a roof having a pitch of 4/12.

Similarly, FIGS. 14-16 illustrate the bucket holder 2 of the present invention for use on a roof with a pitch of $4/12$ and supporting a bucket 4 therein in an upright, vertical disposition. The segments 34 of the inner wall 18 shown in FIG. 16 that are illustrated with hatched lines are the segments 34 on which the bottom of the bucket 4 rests when the bucket holder 2 is used on a roof having a $4/12$ pitch. A roof with a $4/12$ pitch slopes at an angle of about 18.43 degrees. Therefore, the segments 34 illustrated with hatched lines in FIG. 16 are similarly angled at about 18.43 degrees in a direction opposite to the slope of the roof on which the bucket holder of the present invention is used.

Figure 17:
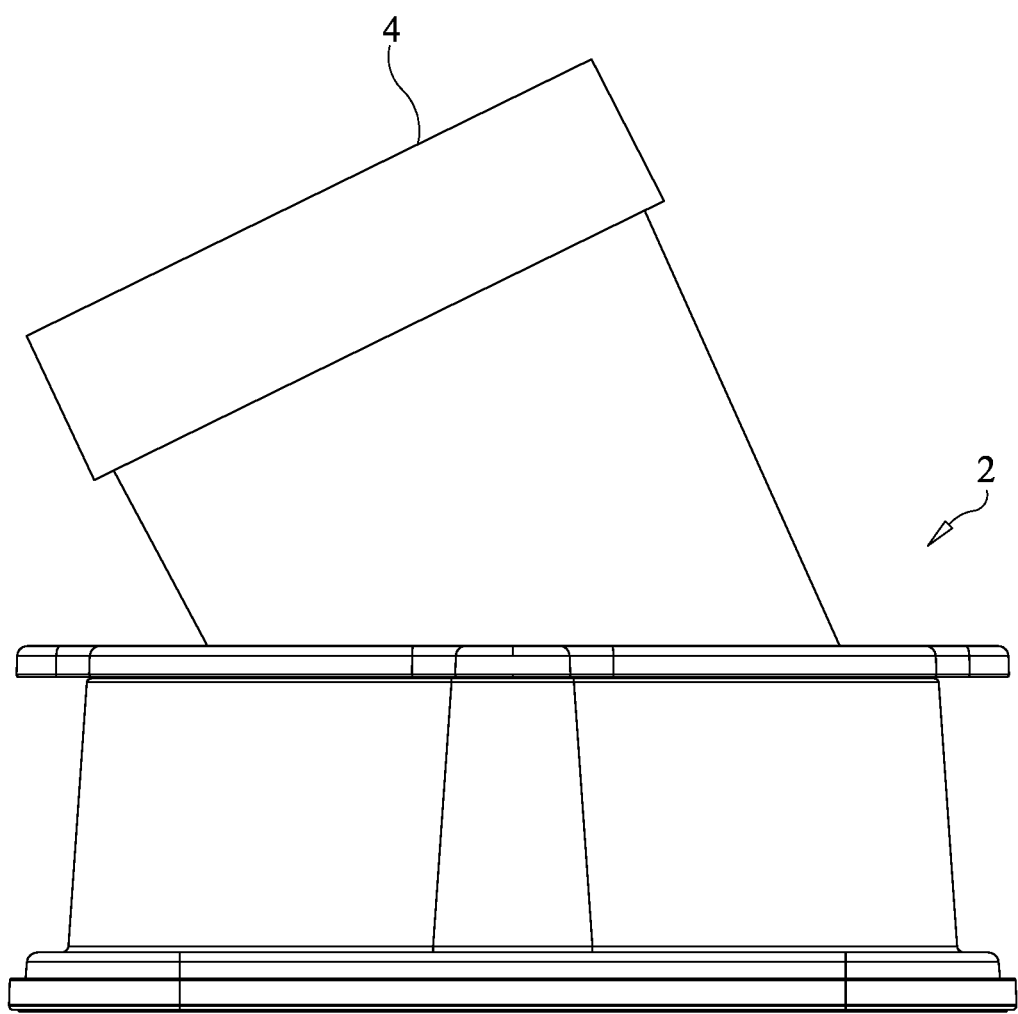
FIG. 17 is a side elevational view of the bucket holder of the present invention shown in FIGS. 1-9, and illustrating a bucket held thereby in an upright, vertical disposition when the bucket holder is used on a roof having a pitch of 6/12.
Figure 18:
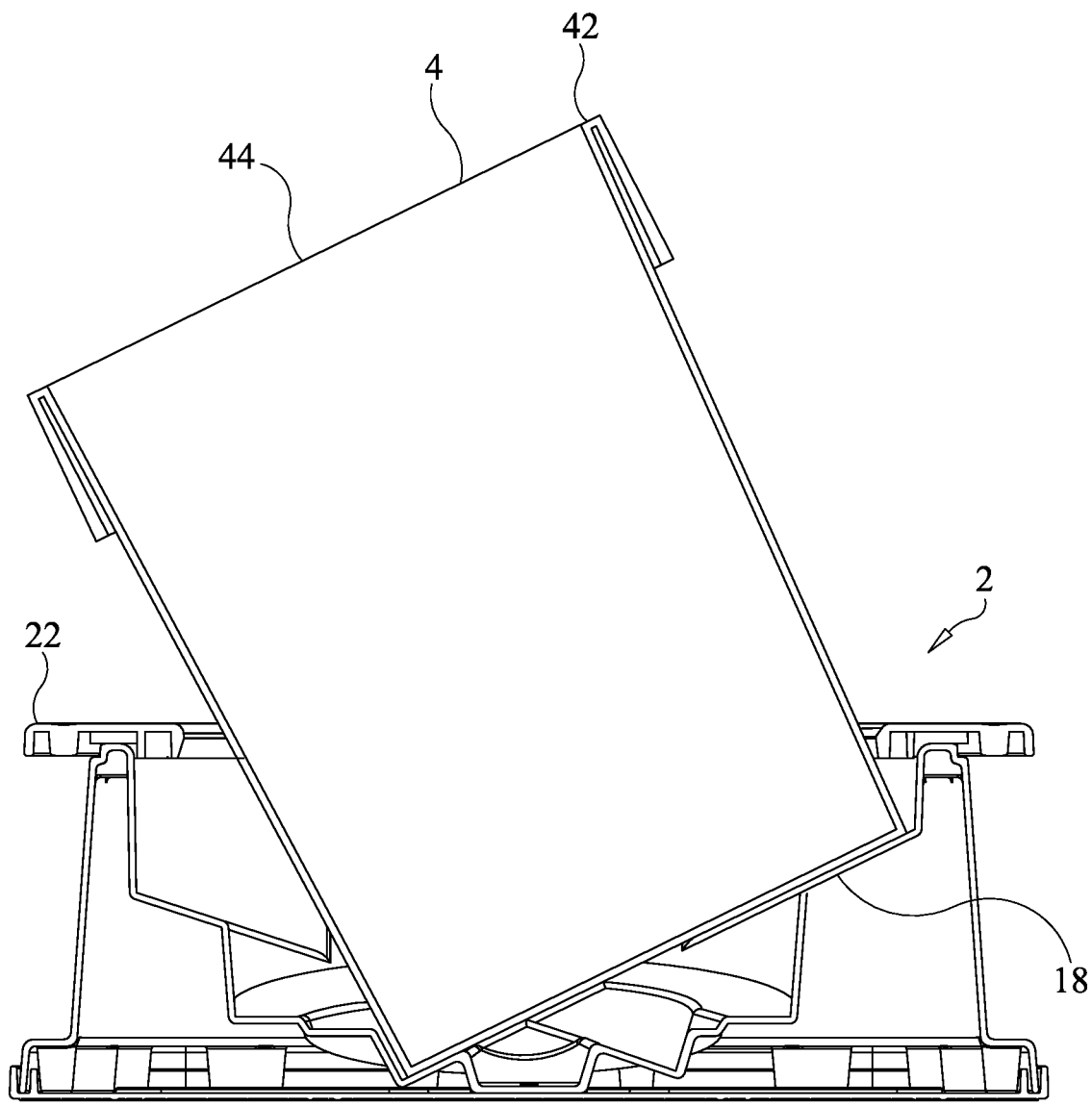
FIG. 18 is a cross-sectional view of the bucket holder of the present invention shown in FIGS. 1-9, and illustrating a bucket held thereby in an upright, vertical disposition when the bucket holder is used on a roof having a pitch of 6/12.
Figure 19:
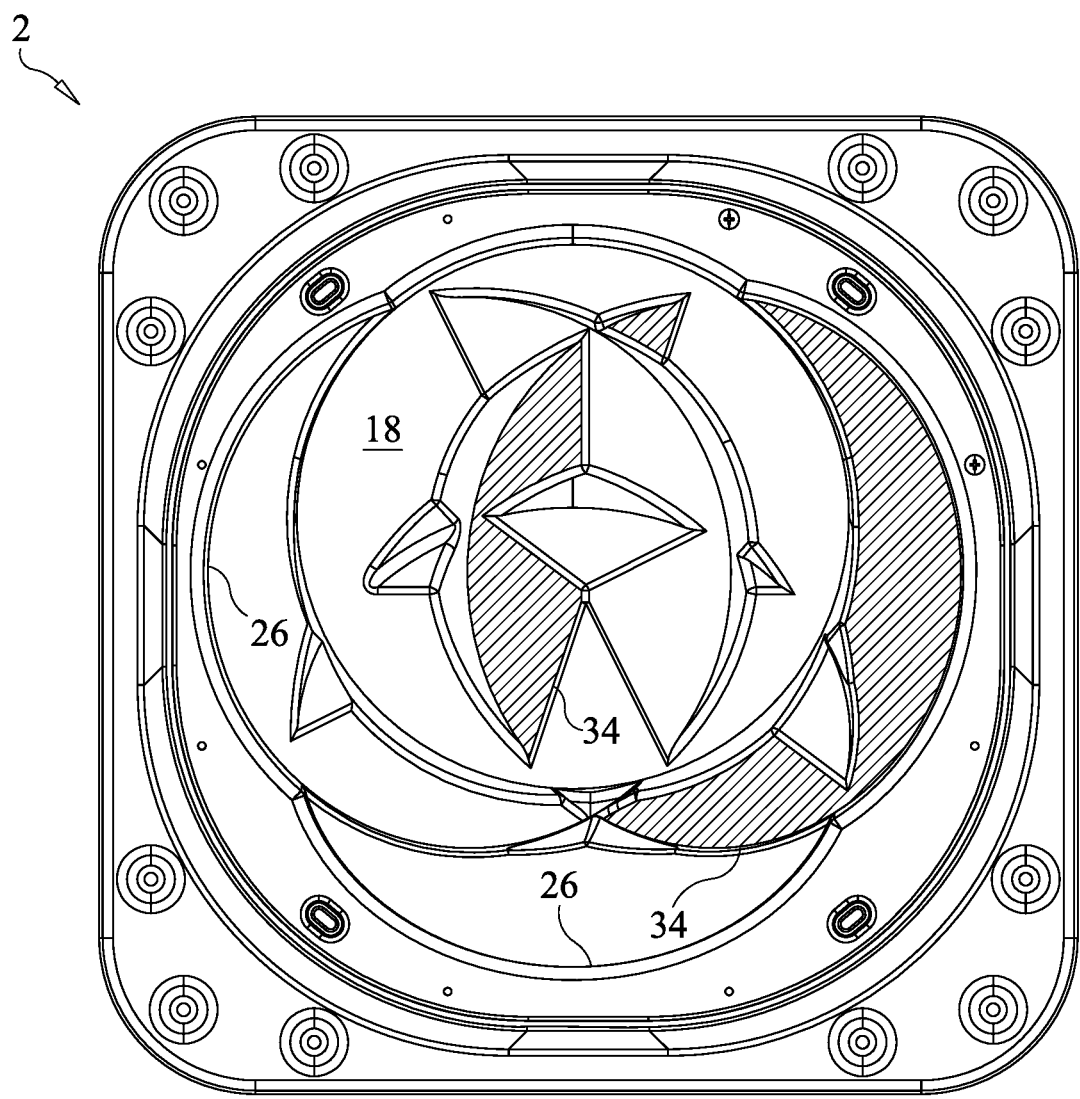
FIG. 19 is a top plan view of the bucket holder of the present invention shown in FIGS. 1-9, with the top ring thereof removed to facilitate a view of the multi-faceted, inner, bucket supporting wall thereof, and illustrating the segments of the inner wall on which a bucket will rest when the bucket holder is used on a roof having a pitch of 6/12.

Likewise, FIGS. 17-19 illustrate the bucket holder 2 of the present invention for use on a roof with a pitch of $6/12$ and supporting a bucket 4 therein in an upright, vertical disposition. The segments 34 of the inner wall 18 shown in FIG. 19 that are illustrated with hatched lines are the segments 34 on which the bottom of the bucket 4 rests when the bucket holder 2 is used on a roof having a $6/12$ pitch. A roof with a $6/12$ pitch slopes at an angle of about 26.57 degrees. Therefore, the segments 34 illustrated with hatched lines in FIG. 19 are similarly angled at about 26.57 degrees in a direction opposite to the slope of the roof on which the bucket holder of the present invention is used.

Figure 20:
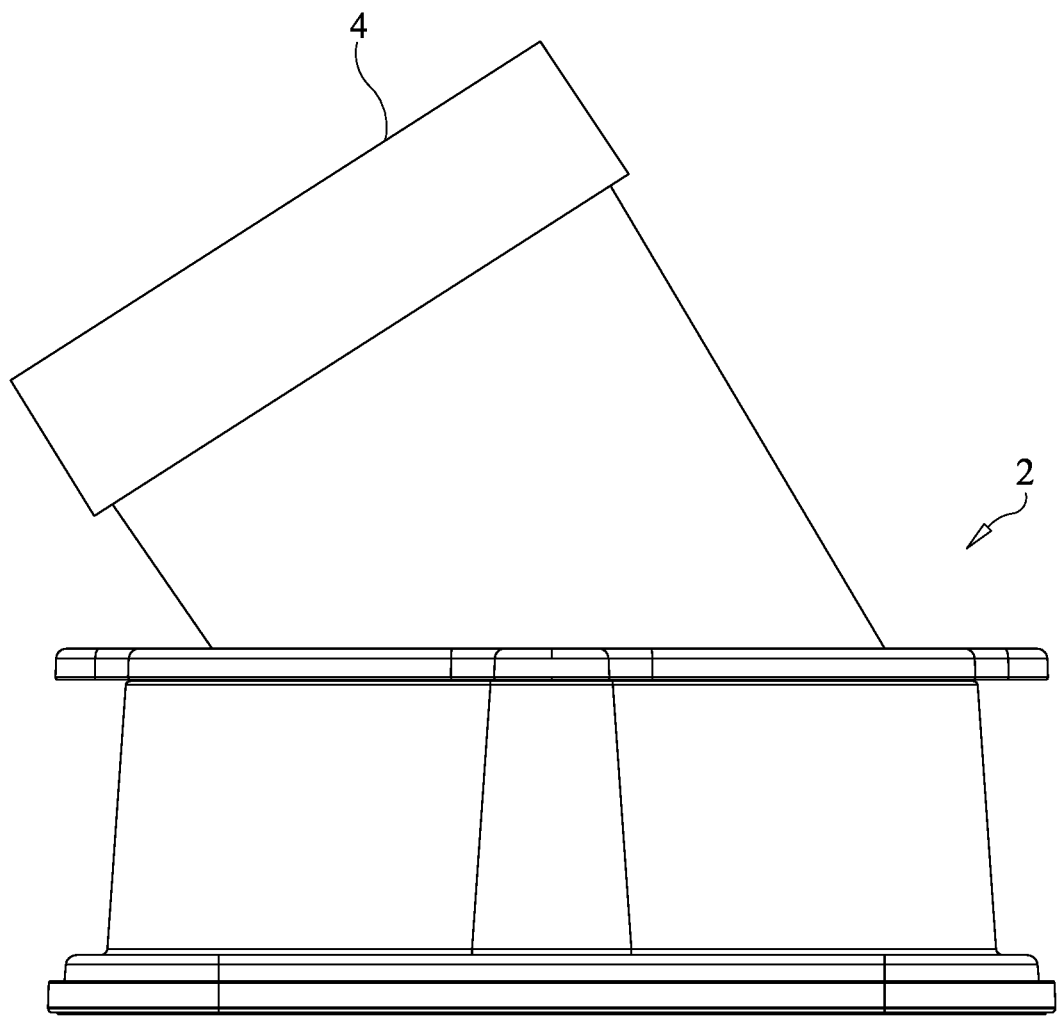
FIG. 20 is a side elevational view of the bucket holder of the present invention shown in FIGS. 1-9, and illustrating a bucket held thereby in an upright, vertical disposition when the bucket holder is used on a roof having a pitch of 8/12.
Figure 21:
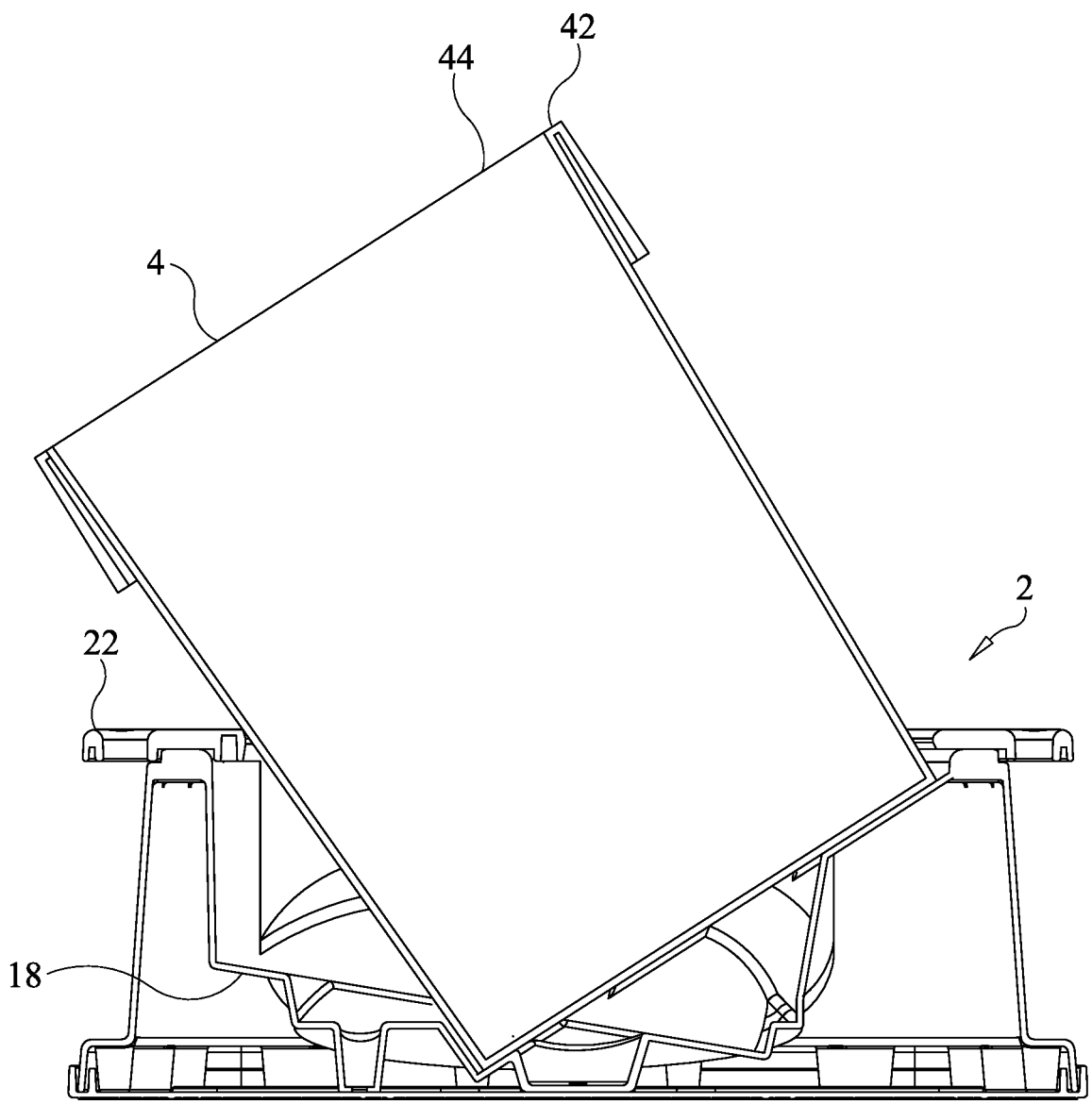
FIG. 21 is a cross-sectional view of the bucket holder of the present invention shown in FIGS. 1-9, and illustrating a bucket held thereby in an upright, vertical disposition when the bucket holder is used on a roof having a pitch of 8/12.
Figure 22:
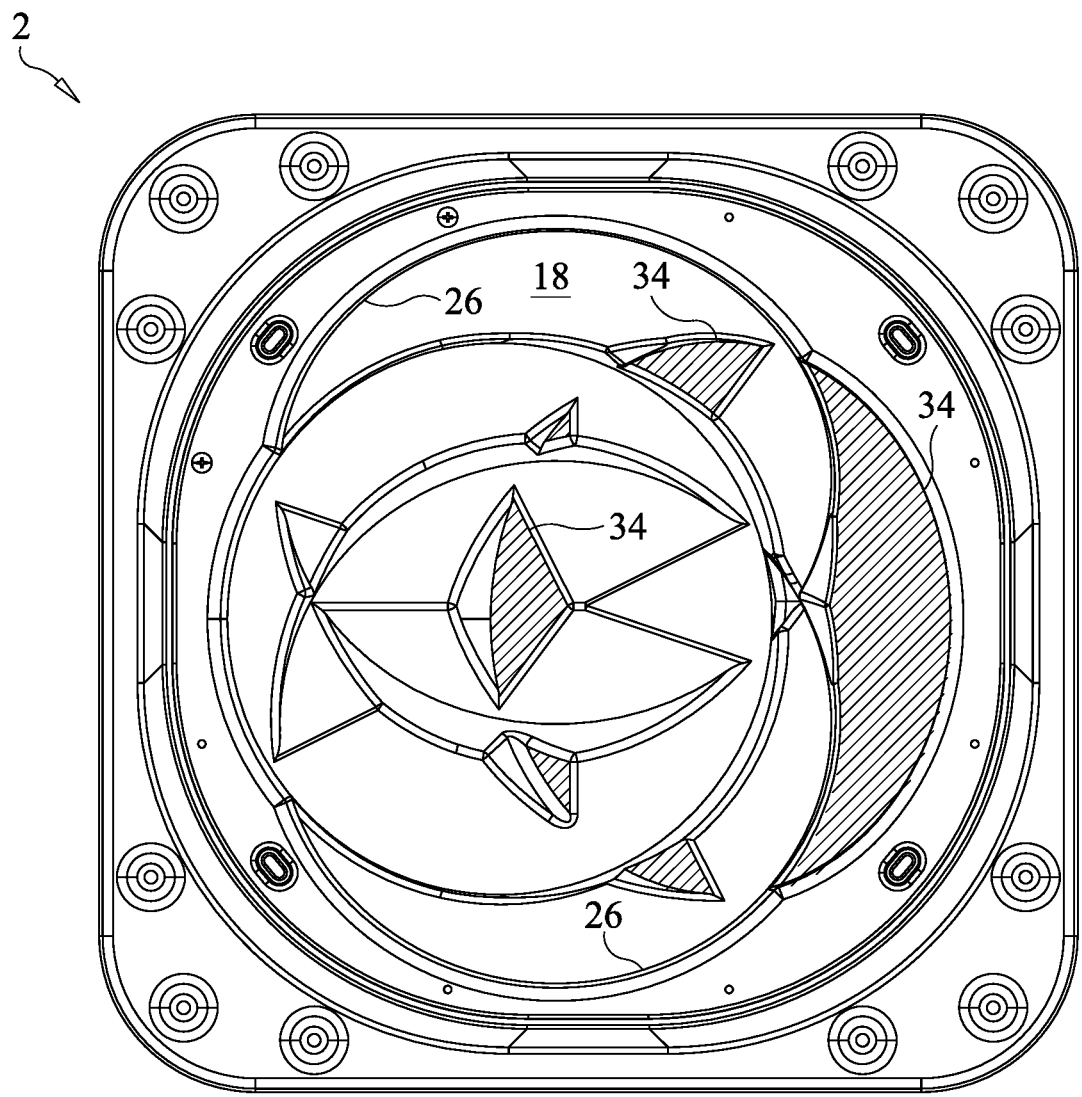
FIG. 22 is a top plan view of the bucket holder of the present invention shown in FIGS. 1-9, with the top ring thereof removed to facilitate a view of the multi-faceted, inner, bucket supporting wall thereof, and illustrating the segments of the inner wall on which a bucket will rest when the bucket holder is used on a roof having a pitch of 8/12.

FIGS. 20-22 illustrate the bucket holder 2 of the present invention for use on a roof with a pitch of $8/12$ and supporting a bucket 4 therein in an upright, vertical disposition. The segments 34 of the inner wall 18 shown in FIG. 22 that are illustrated with hatched lines are the segments 34 on which the bottom of the bucket 4 rests when the bucket holder 2 is used on a roof having a $8/12$ pitch. A roof with an $8/12$ pitch slopes at an angle of about 33.69 degrees. Therefore, the segments 34 illustrated with hatched lines in FIG. 22 are similarly angled at about 33.69 degrees in a direction opposite to the slope of the roof on which the bucket holder of the present invention is used.

FIGS. 26-35 illustrate another embodiment of a bucket holder 2 for use on pitched roofs and constructed in accordance with the present invention. This embodiment of the bucket holder 2 is very similar in structure to that shown in FIGS. 1-25 and described previously, and like reference numbers used in FIGS. 26-35 denote the same or similar components.

Figure 26:
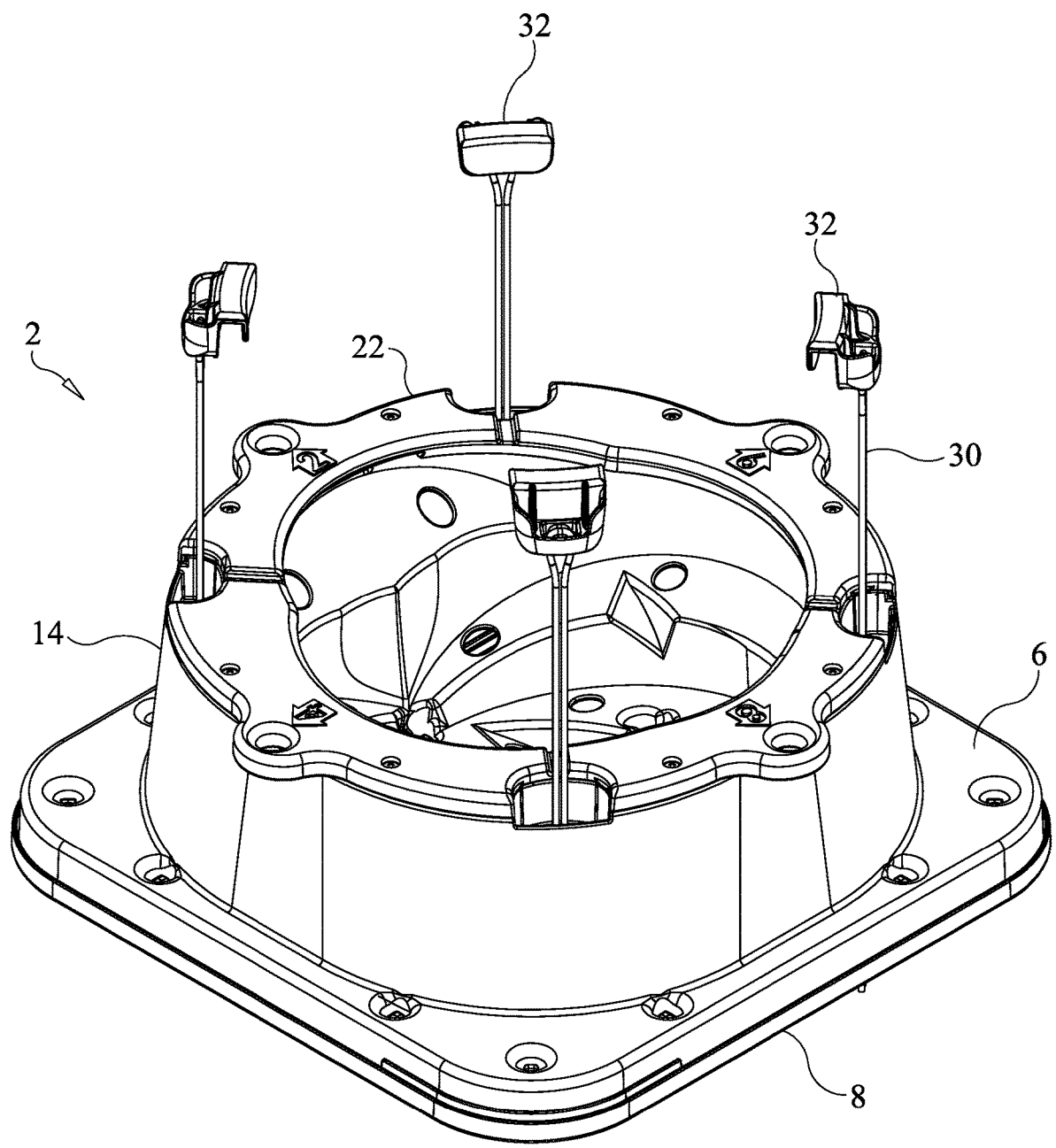
FIG. 26 is a top perspective view of another embodiment of a bucket holder constructed in accordance with the present invention.
Figure 28:
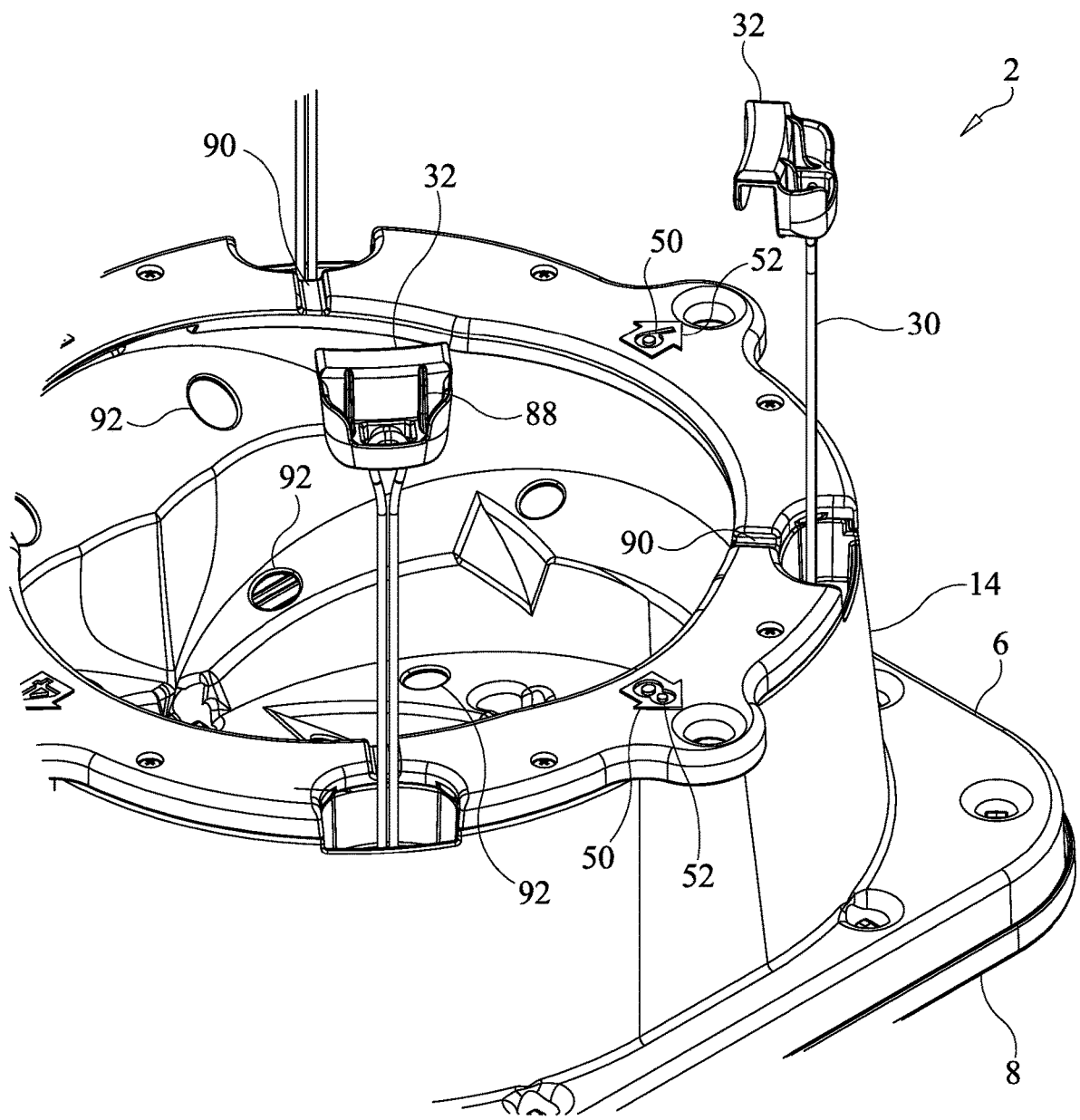
FIG. 28 is an enlarged top perspective view of a portion of the bucket holder of the present invention shown in FIGS. 26 and 27.

As may be seen in FIGS. 26-28, the top ring 22 may include a numerical or other notation, such as numbers 50 within arrows 52, imprinted on or formed in the upper surface thereof and positioned in alignment with the center of each arcuate edge portion 26. When the bucket holder 2 is placed on a roof having a pitch of 2/12, for example, the bucket holder 2 should be positioned such that the arrow 52 having the number "2" 50 therewithin should be pointing to the peak of the roof. Similarly, for use on a roof having a pitch of 4/12, 6/12 and 8/12, the bucket holder 2 should be respectively positioned on the roof with the arrow 52 having the number "4", "6" and "8" 50 pointing to the peak of the roof. Such arrows 52 and numbers 50, or other notations, are provided to help a worker properly position the bucket holder 2 on a roof having a particular pitch to ensure that a bucket 4 supported thereby will be held in a substantially upright disposition. Furthermore, the arrows 52 and numbers 50, or other notations, being centered on the arcuate edge portions 26 of the top ring 22, indicate to a user of the bucket holder 2 which arcuate edge portion 26 the side of the bucket 2 should lean against to, again, help support the bucket 4 properly in the holder 2 in a substantially upright disposition, depending on the pitch of the roof.

Figure 29:
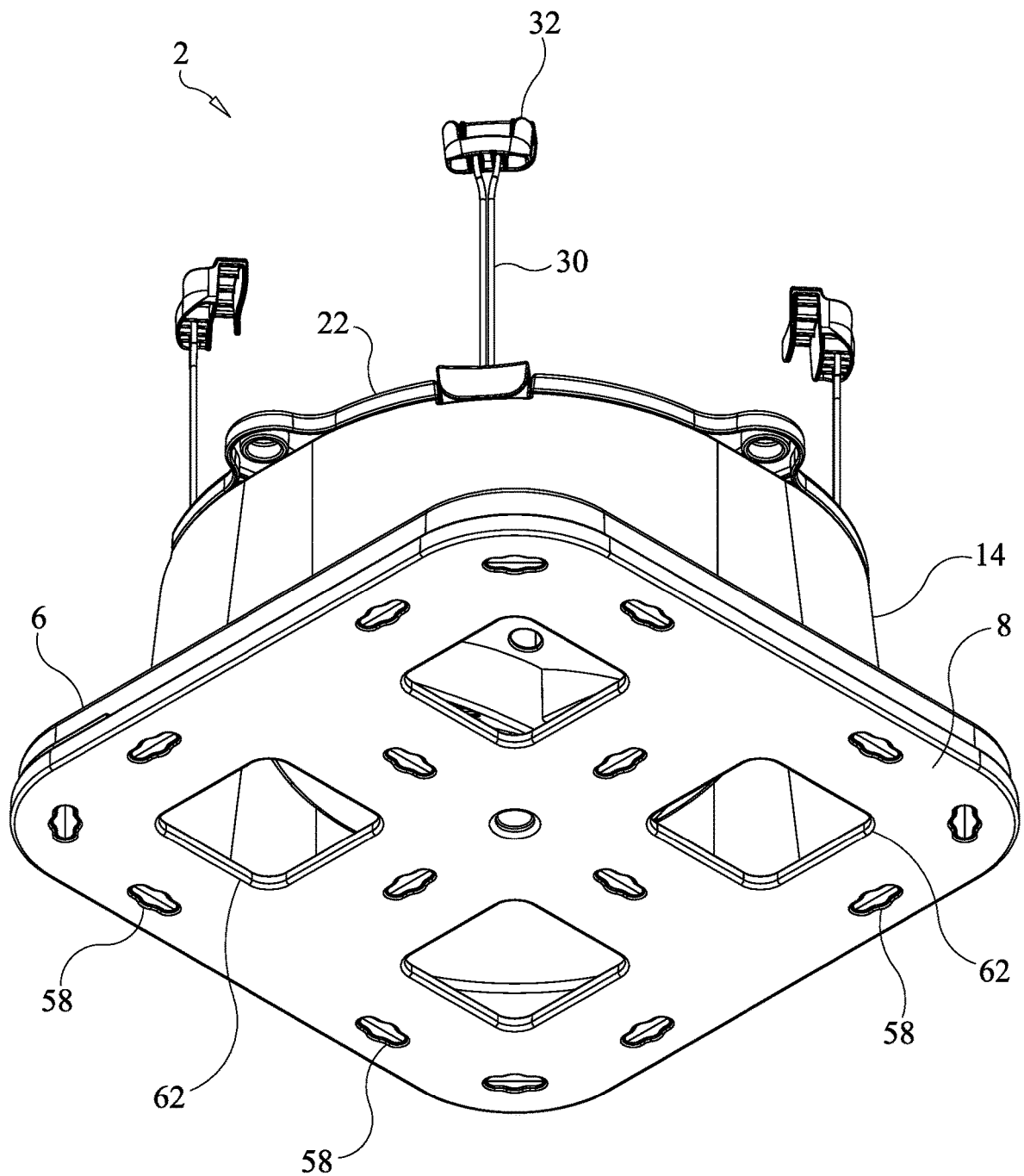
FIG. 29 is a bottom perspective view of the bucket holder of the present invention shown in FIGS. 26-28.
Figure 30:
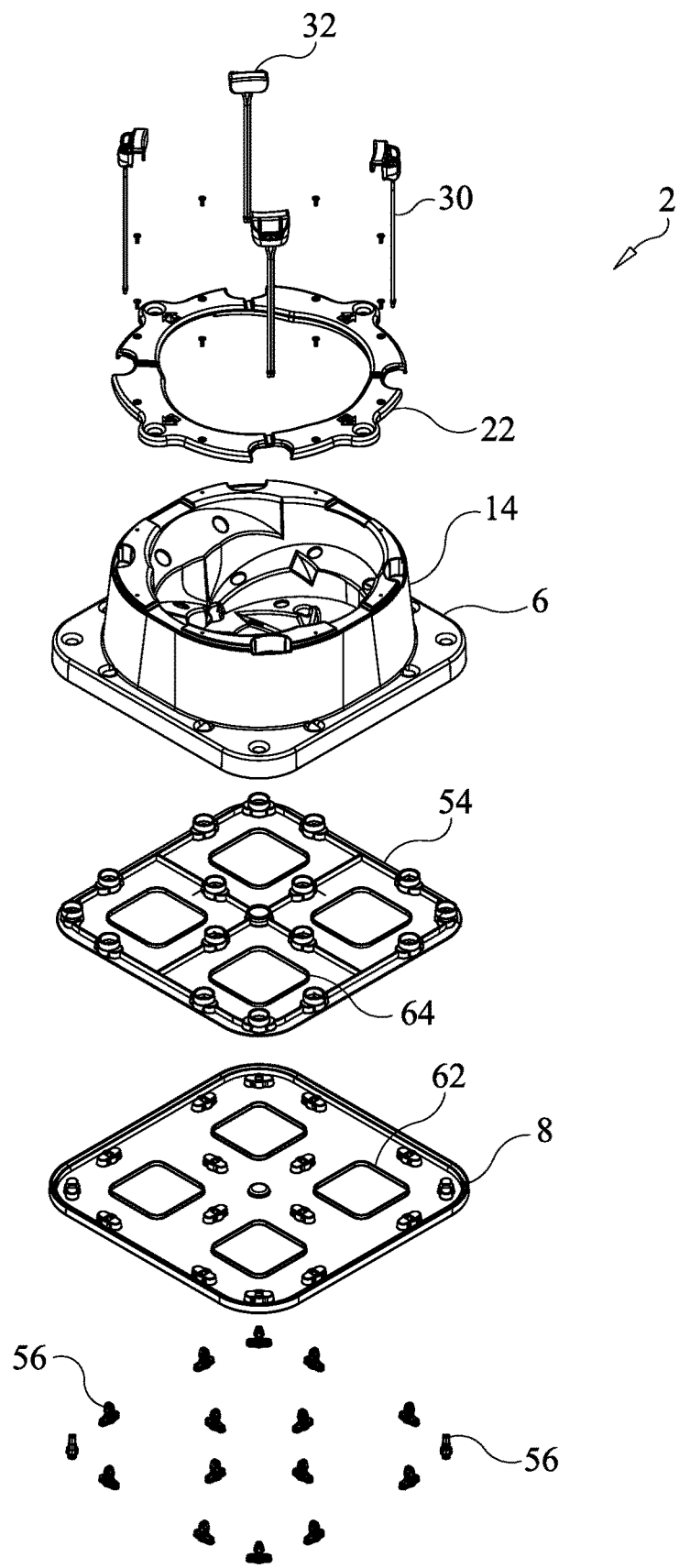
FIG. 30 is an exploded perspective view of the bucket holder of the present invention shown in FIGS. 26-29.
Figure 31:
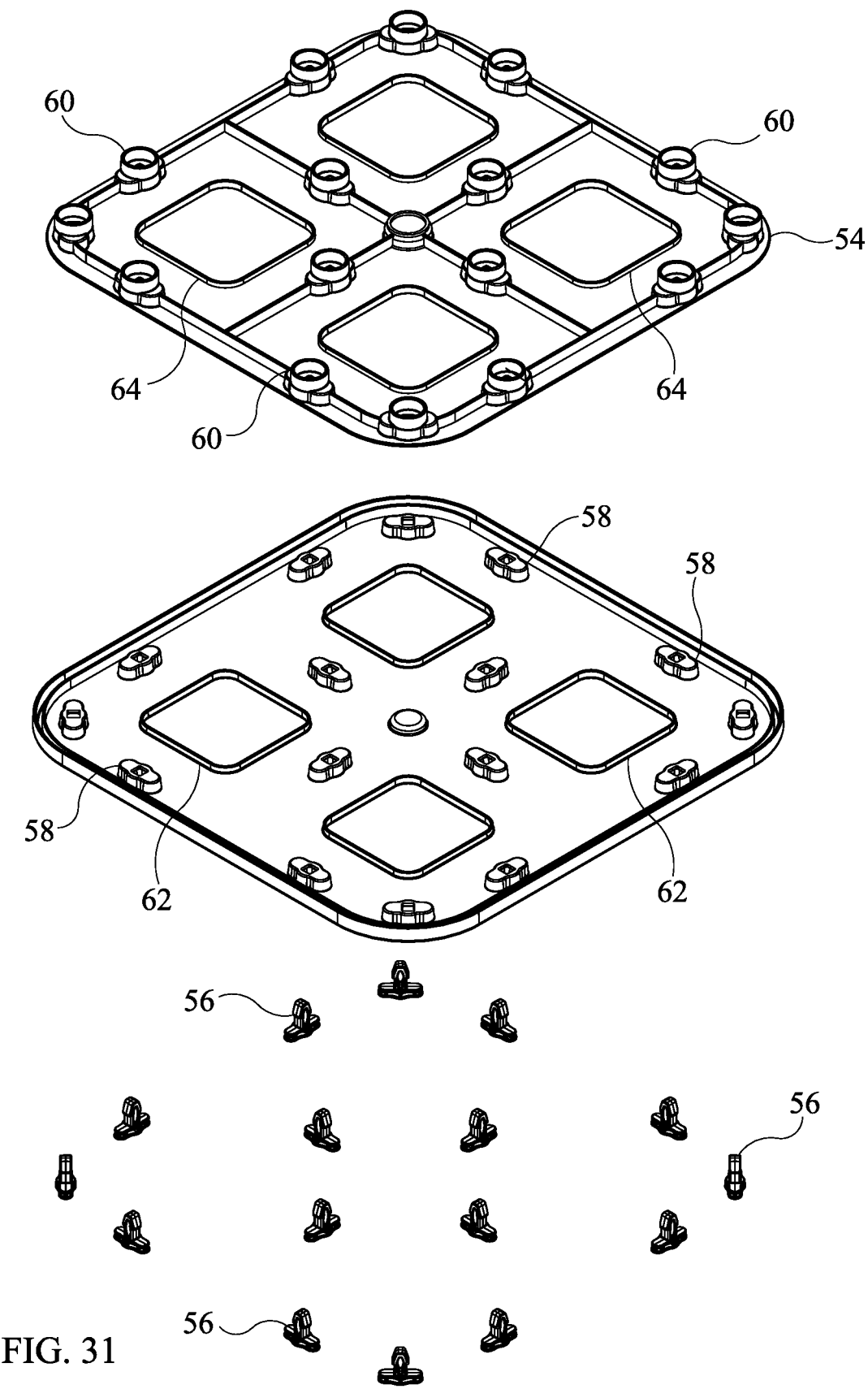
FIG. 31 is an enlarged, exploded perspective view of a portion of the bucket holder of the present invention shown in FIGS. 26-30.

Furthermore, and as may be seen in FIGS. 29-31 of the drawings, the footing 8 that helps prevent the bucket holder 2 from slipping on the roof may be formed as a sheet of rubberized material that occupies substantially the full width and length of the underside of the base 6. Even more preferably, the footing 8 is attached to a planar base plate 54, the base plate 54 being secured to the underside of the base 6. Fasteners 56, such as spread clips, are mounted in a plurality of spaced apart pockets 58 formed in the footing 8, which fasteners 56 extend through apertured bosses 60 formed in the base plate 54 and aligned with the pockets 58 and are lockingly received by openings 12 formed in the base 6 to hold the footing 8 and the base plate 54 to the base 6. The footing 8 may include openings 62 formed through the thickness thereof, which openings 62 are in alignment with similarly-shaped openings 64 formed through the thickness of the base plate 54. The openings 62, 64 in the footing 8 and base plate 54 are provided for weight reduction and to permit water drainage from the main canister 14, but also to allow air to escape from between the roof and footing 8 and to provide more flexibility to the footing 8 so as to help in securing the bucket holder 2 to a pitched roof and to minimize slippage thereon.

Another feature of the embodiment of the bucket holder 2 of the present invention shown in FIGS. 26-35 is the ability of the holder 2 to store the elastic cords or straps 30 within the main canister 14 when the cords 30 are not being used to secure a bucket 4 within the holder 2. In this regard, reference should now be had to FIGS. 32-35 of the drawings. There, it can be seen that the elastic cords 30 may be stored in sockets 66 defined by and formed between the outer side wall 68 and the inner side wall 70 of the main canister 14.

Figure 32:
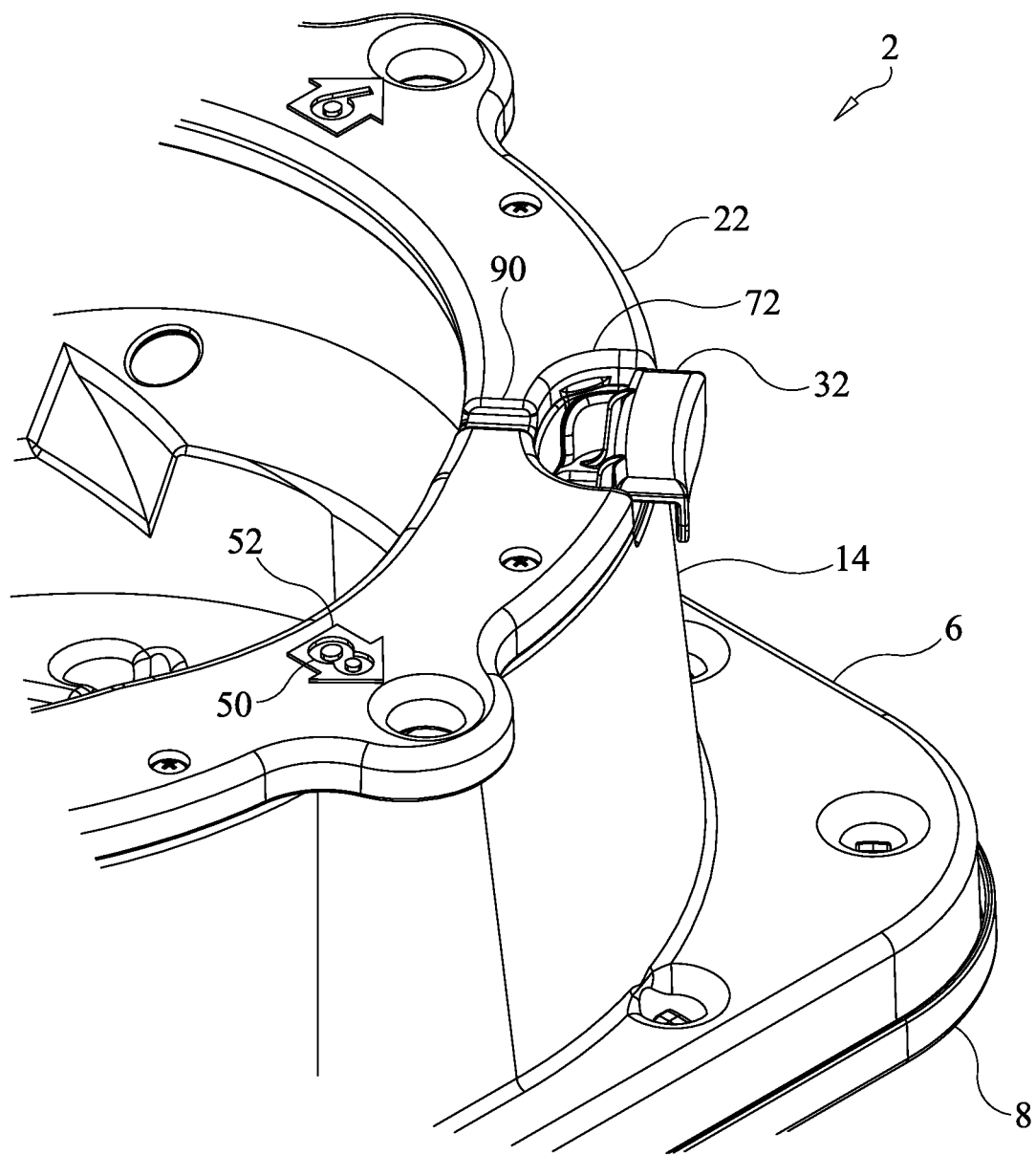
FIG. 32 is an enlarged perspective view of a portion of the bucket holder of the present invention shown in FIGS. 26-31.
Figure 33:
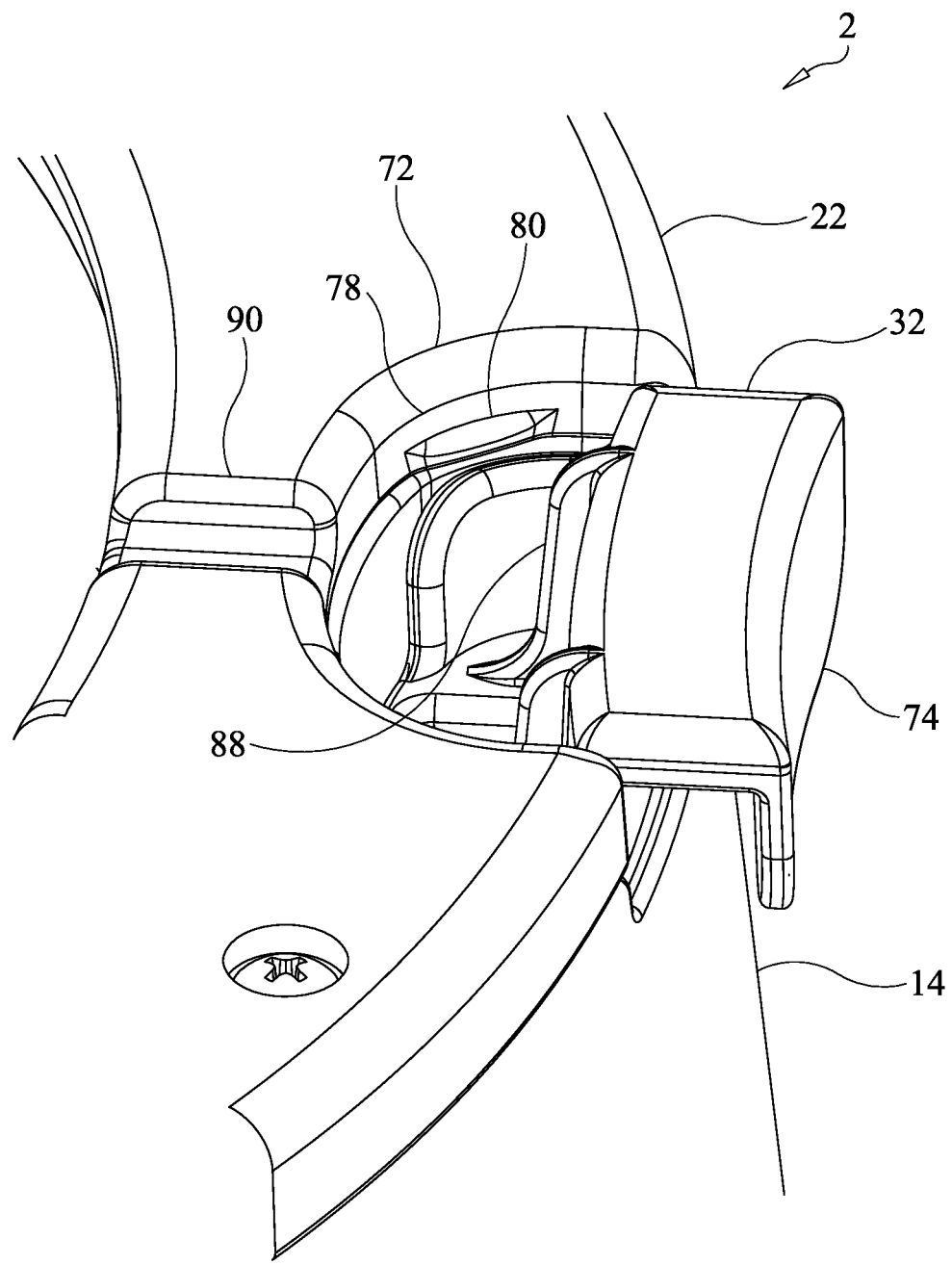
FIG. 33 is an enlarged perspective view of a portion of the bucket holder of the present invention shown in FIGS. 26-32.
Figure 34:
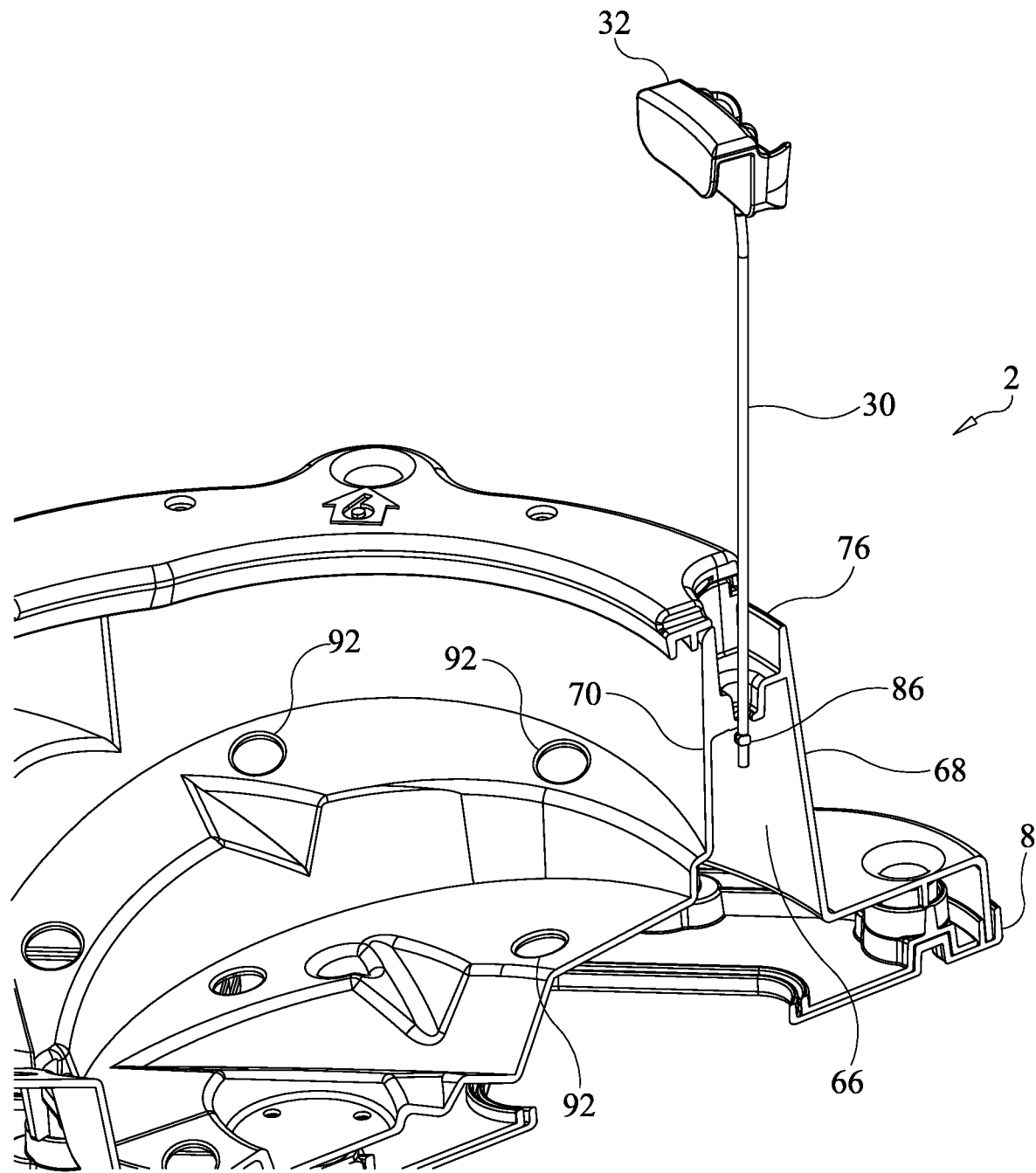
FIG. 34 is an enlarged perspective view of the bucket holder of the present invention shown in FIGS. 26-33, with a portion thereof cut away to illustrate sockets formed in the main canister of the bucket holder that receive elastic cords or straps when such are not being used to secure a bucket within the bucket holder.
Figure 35:
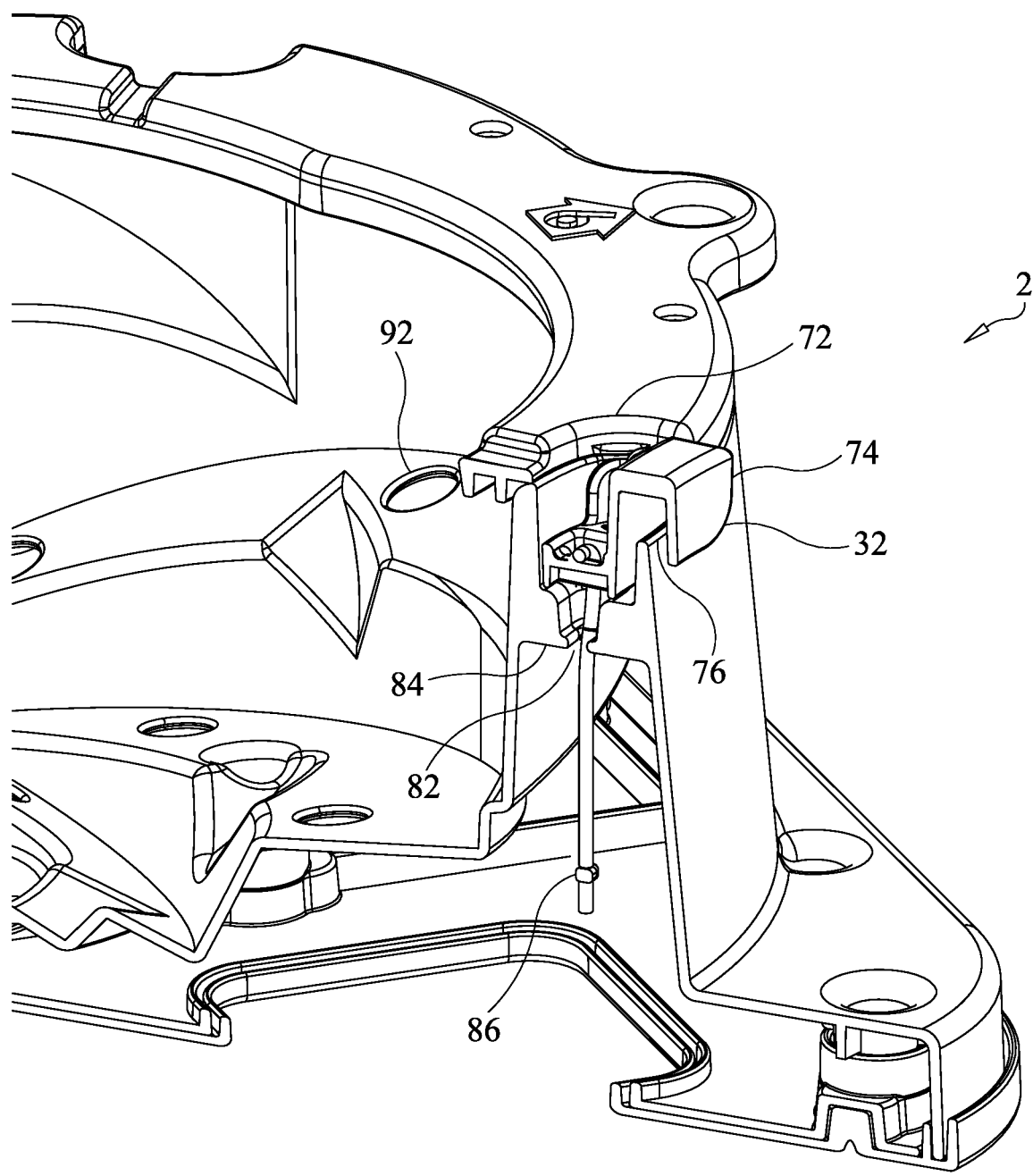
FIG. 35 is an enlarged perspective view of the bucket holder of the present invention shown in FIGS. 26-34, with a portion thereof cut away to illustrate sockets formed in the main canister of the bucket holder that receive elastic cords or straps when such are not being used to secure a bucket within the bucket holder.

More specifically, the U-shaped clips 32 situated at the upper axial ends of the elastic cords 30 to attach to the rim 42 of a bucket 4 held by the bucket holder 2 may be turned 180 degrees from their bucket-holding position shown in FIGS. 26 and 34 to face radially outwardly of the main canister 14, as shown in FIGS. 32, 33 and 35. The clips 32 may be seated in wells 72 formed in the upper surface of the top ring 22 when not in use, the U-shaped portion 74 thereof resting on an edge 76 of the outer side wall 68 of the main canister 14. An arcuate wall 78 of the top ring 22 and/or the main canister 14 defining these clip-receiving wells 72 includes a resilient bump or protrusion 80 extending outwardly therefrom, which bump or protrusion 80 engages a portion of the bucket-holding clip 32 to help hold the clip 32 within its respective well 72 until sufficient force is applied to disengage the protrusion 80 and clip 32 in order to remove the clip 32 from its well 72 and to extend the elastic cord 30 above the top ring 22 of the holder 2.

The elastic cord 30 extends through an opening 82 formed in the bottom wall 84 of the well 72 that communicates with the socket 66 for storing the cord 30. The elastic cord 30 is doubled along its length in two side-by-side sections, as shown in FIGS. 26 and 28, with the lower axial ends thereof being joined together with a double sleeve swage or stop fitting 86 or the like having dimensions that are greater than the diameter of the opening 82 in the well bottom wall 84 to captively hold the elastic cord 30 to the main canister 14 yet allowing the cord 30 to be extended partially from the socket 66 when in use or be inserted back into the socket 66 when not in use.

It should be noted that each bucket-retaining clip 32 includes a stiffening knee brace 88 formed on a wall partially defining the U-shaped portion 74 of the clip 32 to provide additional strength to the clip 32. Furthermore, notches 90 are formed in the upper surface of the top ring 22 that extend between the clip-receiving wells 72 and the central opening 24 formed in the ring 22. The notches 90 are dimensioned to receive portions of the elastic cords 30 that may be draped into the central opening 24 prior to a bucket 4 being inserted in the central opening 24 and before the clips 32 are affixed to the rim 44 of the bucket 4. Additionally, in a preferred form of the bucket holder 2 of the present invention, openings 92 may be formed in the segments 34 of the bucket supporting inner wall 18 to provide drainage of water collecting in the main canister 14 therethrough and through the openings 64, 62 formed in the base plate 54 and footing 8.

The bucket holder 2 of the present invention will now be further described.

In one form of the present invention, a bucket holder 2 for use on pitched roofs is adapted to hold a bucket 4 such as one having a bottom wall 40 and a rim 42 situated opposite the bottom wall 40 and defining a top opening 44 of the bucket 4. The bucket holder 2 preferably includes a planar base 6, the planar base 6 being adapted to rest on a surface of the roof; a generally cylindrically-shaped main canister 14 for holding the bucket 4 in a substantially upright, vertical disposition when the bucket holder 2 is placed on a pitched roof, the main canister 14 being mounted on the base 6; and a top ring 22 mounted on the main canister 14. The main canister 14 has a multi-faceted, bucket supporting inner wall 18 formed of a plurality of segments 34 having different relative heights and angles whereby, when the bucket 4 is placed in the main canister 14 of the bucket holder 2 in a desired position, the bottom wall 40 of the bucket 4 rests on one or more of the segments 34 of the bucket supporting inner wall 18 of the main canister 14.

Preferably, the bucket holder 2 further includes at least one elastic cord 30, the at least one elastic cord 30 having a first axial end which is fastened to one of the main canister 14, the planar base 6 and the top ring 22, and a second axial end situated opposite the first axial end. Further included is at least one clip 32. The at least one clip 32 is mounted on the at least one elastic cord 30 at the second axial end thereof. The at least one clip 32 is engageable with the rim 42 of the bucket 4 when the bucket 4 is placed in the main canister 14 of the bucket holder 2 to help secure the bucket 4 in place on the bucket holder 2.

Preferably, the relative heights and angles of the segments 34 of the bucket supporting inner wall 18 of the main canister 14 are selected such that the bucket 4 when received by and supported by the bucket holder 2 will be held in a substantially upright, vertical disposition on a roof having a pitch corresponding to about at least one of the following fractions: about 2/12, about 4/12, about 6/12 and about 8/12, where the numerator and the denominator of the fractions respectively represent a vertical change in height of the roof over a predetermined horizontal length of the roof.

In yet another form of the present invention, a bucket holder 2 for use on pitched roofs and for holding a bucket 4 therein includes a base 6, the base 6 having an upper side 46 and a lower side 48 situated opposite the upper side 46; and a bucket supporting main canister 14 mounted on the upper side 46 of the base 6 and extending outwardly therefrom. The main canister 14 has a side wall 16 and a bucket supporting inner wall 18. The side wall 16 extends from the base 6 and defines a top opening 20 situated opposite the base 6 for receiving the bucket 4 therein. The bucket supporting inner wall 18 is formed with a plurality of segments 34 having different relative heights and angles wherein, when the bucket 4 is placed in the top opening 20 of the main canister 14 in a desired position, the bucket 4 rests on one or more of the segments 34 such that the bucket 4 is supported thereby in a substantially upright, vertical disposition when the bucket holder 2 is placed on a pitched roof.

Preferably, the base 6 of the bucket holder 4 is formed as a generally planar, rectangular member. Furthermore, the base 6 may include at least one footing 8 formed of an anti-slip material.

Additionally, the base 6 of the bucket holder 4 includes a plurality of openings 12 formed through the thickness thereof, the openings 12 being provided for receiving one of cables and fasteners (not shown) to help secure the bucket holder 2 on a pitched roof.

In yet another preferred form, the main canister 14 of the bucket holder 2 has a generally cylindrical shape defined by the side wall 16 thereof.

Even more preferably, a bucket holder 2 formed in accordance with the present invention further includes a top ring 22 mounted on the main canister 14 at the top opening 20 thereof. The top ring 22 includes a central opening 24 formed through the thickness thereof, the central opening 24 being in communication with the top opening 20 formed in the main canister 14. Furthermore, the top ring 22 includes arcuate edge portions 26 at least some of which are formed with relatively different radii and which define the central opening 24 formed in the top ring 22. The arcuate edge portions 26 are used to help support the bucket 4 received by the bucket holder 2 whereby, when the bucket 4 is received by the bucket holder 2, a portion of the bucket 4 (e.g., the side of the bucket 4) will rest against and be supported by one of the arcuate edge portions 26 of the top ring 22 to help hold the bucket 4 in a substantially upright, vertical disposition when the bucket holder 2 is placed on a pitched roof.

The top ring 22 of the bucket holder 2 may include a plurality of spaced apart openings 28 formed through the thickness thereof. Furthermore, the bucket holder 2 may further include at least one elastic cord 30. The at least one elastic cord 30 has a first axial end and a second axial end situated opposite the first axial end. The first axial end of the at least one elastic cord 30 is secured to the top ring 22 through one opening 28 of the plurality of openings 28 formed therein. The at least one elastic cord 30 has a fastener 32 mounted on the second axial end thereof, the fastener 32 being provided to engage a portion (e.g., the rim 42) of the bucket 4 received by the bucket holder 2 and supported thereby. Preferably, the fastener 32 of the at least one elastic cord 30 is formed as a U-shaped clip.

In yet another preferred form of the bucket holder 2 of the present invention, at least one of the base 6 and the top ring 22 includes a plurality of openings 12, 33 formed therein, the openings 12, 33 being provided for receiving one of cables and fasteners (not shown) to help secure the bucket holder 2 on a pitched roof.

Preferably, the relative heights and angles of the segments 34 of the bucket supporting inner wall 18 of the main canister 14 of the bucket holder 2 are selected such that the bucket 4 when received by and supported by the bucket holder 2 will be held in a substantially upright, vertical disposition on a roof having a pitch corresponding to about at least one of the following fractions: about 2/12, about 4/12, about 6/12 and about 8/12, where the numerator and the denominator of the fractions respectively represent a vertical change in height of the roof over a predetermined horizontal length of the roof.

In still another form of the present invention, a bucket holder 2 for use on pitched roofs and for holding a bucket 4 therein includes a bucket supporting main canister 14, the main canister 14 having a side wall 16 and a bucket supporting inner wall 18. The side wall 16 defines a top opening 20 for receiving the bucket 4 therein. The bucket supporting inner wall 18 is formed with a plurality of segments 34 having different relative heights and angles wherein, when the bucket 4 is placed in the top opening 20 of the main canister 14 in a desired position, the bucket 4 rests on one or more of the segments 34 such that the bucket 4 is supported thereby in a substantially upright, vertical disposition when the bucket holder 2 is placed on a pitched roof.

The bucket holder 2 described above may further include a top ring 22 mounted on the main canister 14 at the top opening 20 thereof. The top ring 22 includes a central opening 24 formed through the thickness thereof, the central opening 24 being in communication with the top opening 20 formed in the main canister 14. Preferably, the top ring 22 includes arcuate edge portions 26 at least some of which are formed with relatively different radii and which define the central opening 24 formed in the top ring 22. The arcuate edge portions 26 are used to help support the bucket 4 received by the bucket holder 2 whereby, when the bucket 4 is received by the bucket holder 2, a portion of the bucket 4 (e.g., the side of the bucket 4) will rest against and be supported by one of the arcuate edge portions 26 of the top ring 22 to help hold the bucket 4 in a substantially upright, vertical disposition when the bucket holder 2 is placed on a pitched roof.

Furthermore, the bucket holder 2 described above may include a base 6. The base 6 has an upper side 46 and a lower side 48 situated opposite the upper side 46. The bucket supporting main canister 14 is mounted on the upper side 46 of the base 6 and extending outwardly therefrom. Also, the base 6 is preferably formed as a generally planar, rectangular member, and includes at least one footing 8 formed of an anti-slip material.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A bucket holder for use on pitched roofs and for holding a bucket therein, the bucket having a bottom wall and a rim situated opposite the bottom wall and defining a top opening of the bucket, the bucket holder comprising:
   a planar base, the planar base being adapted to rest on a surface of the roof;
   a generally cylindrically-shaped main canister for holding the bucket in a substantially upright, vertical disposition when the bucket holder is placed on a pitched roof, the main canister being mounted on the base, the main canister having a top opening for receiving a bucket therein; and
   a top ring mounted on the main canister;
   wherein the main canister has a multi-faceted, bucket supporting inner wall, the inner wall being formed of a plurality of segments, at least some of the segments of the bucket supporting inner wall being disposed at different heights and angles within the main canister relative to the top opening thereof;
   whereby, when the bucket is placed in the main canister of the bucket holder in a desired position, the bottom wall of the bucket rests on one or more of the segments of the bucket supporting inner wall of the main canister; and
   whereby the bucket holder is configurable in different positions on roofs of different pitches such that different segments of the bucket supporting inner wall of the main canister will be engagable with the bottom of the bucket to support the bucket in a substantially upright, vertical disposition when the bucket holder is placed on roofs of different pitches.

2. A bucket holder for use on pitched roofs and for holding a bucket therein, the bucket having a bottom wall and a rim situated opposite the bottom wall and defining a top opening of the bucket, the bucket holder comprising:
   a planar base, the planar base being adapted to rest on a surface of the roof;
   a generally cylindrically-shaped main canister for holding the bucket in a substantially upright, vertical disposition when the bucket holder is placed on a pitched roof, the main canister being mounted on the base; and
   a top ring mounted on the main canister;
   wherein the main canister has a multi-faceted, bucket supporting inner wall formed of a plurality of segments having different relative heights and angles;
   whereby, when the bucket is placed in the main canister of the bucket holder in a desired position, the bottom wall of the bucket rests on one or more of the segments of the bucket supporting inner wall of the main canister;
   wherein the bucket holder further comprises:
   at least one elastic cord, the at least one elastic cord having a first axial end which is fastened to one of the main canister, the planar base and the top ring, and a second axial end situated opposite the first axial end; and
   at least one clip, the at least one clip being mounted on the at least one elastic cord at the second axial end thereof, the at least one clip being engageable with the rim of the bucket when the bucket is placed in the main canister of the bucket holder to help secure the bucket in place on the bucket holder.

3. A bucket holder as defined by claim 1, wherein the different heights and angles of the segments of the bucket supporting inner wall of the main canister relative to the top opening thereof are selected such that the bucket when received by and supported by the bucket holder will be held in a substantially upright, vertical disposition on a roof having a pitch corresponding to about at least one of the following fractions: about $2/12$, about $4/12$, about $6/12$ and about $8/12$, where the numerator and the denominator of the fractions respectively represent a vertical change in height of the roof over a predetermined horizontal length of the roof.

4. A bucket holder for use on pitched roofs and for holding a bucket therein, the bucket having a bottom wall and a rim situated opposite the bottom wall and defining a top opening of the bucket, the bucket holder comprising:
   a base, the base having an upper side and a lower side situated opposite the upper side; and
   a bucket supporting main canister mounted on the upper side of the base and extending outwardly therefrom, the main canister having a side wall and a bucket supporting inner wall, the side wall extending from the base and defining a top opening situated opposite the base for receiving the bucket therein, the bucket supporting inner wall being formed with a plurality of segments, at least some of the segments of the bucket supporting inner wall being disposed at different heights and angles within the main canister relative to the top opening thereof;
   whereby the bucket holder is configurable in different positions on roofs of different pitches such that different segments of the bucket supporting inner wall of the main canister will be engagable with the bottom of the bucket to support the bucket in a substantially upright, vertical disposition when the bucket holder is placed on roofs of different pitches.

5. A bucket holder for use on pitched roofs and for holding a bucket therein, which comprises:
   a base, the base having an upper side and a lower side situated opposite the upper side, wherein the base is formed as a generally planar, rectangular member; and
   a bucket supporting main canister mounted on the upper side of the base and extending outwardly therefrom, the main canister having a side wall and a bucket supporting inner wall, the side wall extending from the base and defining a top opening situated opposite the base for receiving the bucket therein, the bucket supporting inner wall being formed with a plurality of segments having different relative heights and angles wherein, when the bucket is placed in the top opening of the main canister in a desired position, the bucket rests on one or more of the segments such that the bucket is supported thereby in a substantially upright, vertical disposition when the bucket holder is placed on a pitched roof.

6. A bucket holder as defined by claim 4, wherein the base includes at least one footing formed of an anti-slip material.

7. A bucket holder as defined by claim 4, for use on pitched roofs and for holding a bucket therein, which comprises:
   a base, the base having an upper side and a lower side situated opposite the upper side, wherein the base includes a plurality of openings formed through the thickness thereof, the openings being provided for receiving one of cables and fasteners to help secure the bucket holder on a pitched roof; and a bucket supporting main canister mounted on the upper side of the base and extending outwardly therefrom, the main canister having a side wall and a bucket supporting inner wall, the side wall extending from the base and defining a top opening situated opposite the base for receiving the bucket therein, the bucket supporting inner wall being formed with a plurality of segments having different relative heights and angles wherein, when the bucket is placed in the top opening of the main canister in a desired position, the bucket rests on one or more of the segments such that the bucket is supported thereby in a substantially upright, vertical disposition when the bucket holder is placed on a pitched roof.

8. A bucket holder as defined by claim 4, wherein the main canister has a generally cylindrical shape defined by the side wall thereof.

9. A bucket holder as defined by claim 4, which further comprises:

a top ring mounted on the main canister at the top opening thereof, wherein the top ring includes a central opening formed through the thickness thereof, the central opening being in communication with the top opening formed in the main canister.

10. A bucket holder for use on pitched roofs and for holding a bucket therein, which comprises:

a base, the base having an upper side and a lower side situated opposite the upper side; and a bucket supporting main canister mounted on the upper side of the base and extending outwardly therefrom, the main canister having a side wall and a bucket supporting inner wall, the side wall extending from the base and defining a top opening situated opposite the base for receiving the bucket therein, the bucket supporting inner wall being formed with a plurality of segments having different relative heights and angles wherein, when the bucket is placed in the top opening of the main canister in a desired position, the bucket rests on one or more of the segments such that the bucket is supported thereby in a substantially upright, vertical disposition when the bucket holder is placed on a pitched roof;

wherein the bucket holder further comprises:

a top ring mounted on the main canister at the top opening thereof, wherein the top ring includes a central opening formed through the thickness thereof, the central opening being in communication with the top opening formed in the main canister;

wherein the top ring includes arcuate edge portions at least some of which are formed with relatively different radii and which define the central opening formed in the top ring, the arcuate edge portions being used to help support the bucket received by the bucket holder whereby, when the bucket is received by the bucket holder, a portion of the bucket will rest against and be supported by one of the arcuate edge portions of the top ring to help hold the bucket in a substantially upright, vertical disposition when the bucket holder is placed on a pitched roof.

11. A bucket holder for use on pitched roofs and for holding a bucket therein, which comprises:

a base, the base having an upper side and a lower side situated opposite the upper side; and a bucket supporting main canister mounted on the upper side of the base and extending outwardly therefrom, the main canister having a side wall and a bucket supporting inner wall, the side wall extending from the base and defining a top opening situated opposite the base for receiving the bucket therein, the bucket supporting inner wall being formed with a plurality of segments having different relative heights and angles wherein, when the bucket is placed in the top opening of the main canister in a desired position, the bucket rests on one or more of the segments such that the bucket is supported thereby in a substantially upright, vertical disposition when the bucket holder is placed on a pitched roof;

wherein the bucket holder further comprises:

a top ring mounted on the main canister at the top opening thereof, wherein the top ring includes a central opening formed through the thickness thereof, the central opening being in communication with the top opening formed in the main canister, wherein the top ring includes a plurality of spaced apart openings formed through the thickness thereof; and at least one elastic cord, the at least one elastic cord including a first axial end and a second axial end situated opposite the first axial end, the first axial end of the at least one elastic cord being secured to the top ring through one opening of the plurality of openings formed therein, the at least one elastic cord having a fastener mounted on the second axial end thereof, the fastener being provided to engage a portion of the bucket received by the bucket holder and supported thereby.

12. A bucket holder as defined by claim 11, wherein the fastener of the at least one elastic cord is formed as a U-shaped clip.

13. A bucket holder for use on pitched roofs and for holding a bucket therein, which comprises:

a base, the base having an upper side and a lower side situated opposite the upper side; and a bucket supporting main canister mounted on the upper side of the base and extending outwardly therefrom, the main canister having a side wall and a bucket supporting inner wall, the side wall extending from the base and defining a top opening situated opposite the base for receiving the bucket therein, the bucket supporting inner wall being formed with a plurality of segments having different relative heights and angles wherein, when the bucket is placed in the top opening of the main canister in a desired position, the bucket rests on one or more of the segments such that the bucket is supported thereby in a substantially upright, vertical disposition when the bucket holder is placed on a pitched roof;

wherein the bucket holder further comprises:

a top ring mounted on the main canister at the top opening thereof, wherein the top ring includes a central opening formed through the thickness thereof, the central opening being in communication with the top opening formed in the main canister;

wherein at least one of the base and the top ring includes a plurality of openings formed therein, the openings being provided for receiving one of cables and fasteners to help secure the bucket holder on a pitched roof.

14. A bucket holder as defined by claim 4, wherein the different heights and angles of the segments of the bucket supporting inner wall of the main canister relative to the top opening thereof are selected such that the bucket when received by and supported by the bucket holder will be held in a substantially upright, vertical disposition on a roof having a pitch corresponding to about at least one of the following fractions: about 2/12, about 4/12, about 6/12 and about 8/12, where the numerator and the denominator of the fractions respectively represent a vertical change in height of the roof over a predetermined horizontal length of the roof.

15. A bucket holder for use on pitched roofs and for holding a bucket therein, the bucket having a bottom wall and a rim situated opposite the bottom wall and defining a top opening of the bucket, the bucket holder comprising:
   a bucket supporting main canister, the main canister having a side wall and a bucket supporting inner wall, the side wall defining a top opening for receiving the bucket therein, the bucket supporting inner wall being formed with a plurality of segments, at least some of the segments of the bucket supporting inner wall being disposed at different heights and angles within the main canister relative to the top opening thereof;
   whereby the bucket holder is configurable in different positions on roofs of different pitches such that different segments of the bucket supporting inner wall of the main canister will be engagable with the bottom of the bucket to support the bucket in a substantially upright, vertical disposition when the bucket holder is placed on roofs of different pitches.

16. A bucket holder for use on pitched roofs and for holding a bucket therein, which comprises:
   a bucket supporting main canister, the main canister having a side wall and a bucket supporting inner wall, the side wall defining a top opening for receiving the bucket therein, the bucket supporting inner wall being formed with a plurality of segments having different relative heights and angles wherein, when the bucket is placed in the top opening of the main canister in a desired position, the bucket rests on one or more of the segments such that the bucket is supported thereby in a substantially upright, vertical disposition when the bucket holder is placed on a pitched roof; and
   a top ring mounted on the main canister at the top opening thereof, wherein the top ring includes a central opening formed through the thickness thereof, the central opening being in communication with the top opening formed in the main canister;
   wherein the top ring includes arcuate edge portions at least some of which are formed with relatively different radii and which define the central opening formed in the top ring, the arcuate edge portions being used to help support the bucket received by the bucket holder whereby, when the bucket is received by the bucket holder, a portion of the bucket will rest against and be supported by one of the arcuate edge portions of the top ring to help hold the bucket in a substantially upright, vertical disposition when the bucket holder is placed on a pitched roof.

17. A bucket holder as defined by claim 16, which further comprises:
   a base, the base having an upper side and a lower side situated opposite the upper side, the bucket supporting main canister being mounted on the upper side of the base and extending outwardly therefrom.

18. A bucket holder as defined by claim 17, wherein the base is formed as a generally planar, rectangular member; and
   wherein the base includes at least one footing formed of an anti-slip material.

19. A bucket holder as defined by claim 15, which further comprises:
   at least one elastic cord, the at least one elastic cord having a first axial end and a second axial end situated opposite the first axial end, the at least one elastic cord having a fastener mounted on the second axial end thereof, the fastener being provided to engage a portion of the bucket received by the bucket holder and supported thereby; and
   wherein at least a portion of the side wall of the main canister is formed with an outer side wall and an inner side wall situated radially inwardly of the outer side wall, the inner side wall and the outer side wall defining at least one socket therebetween for receiving and storing at least a portion of the at least one elastic cord.

* * * * *